United States Patent
Tung et al.

(10) Patent No.: US 9,485,177 B2
(45) Date of Patent: Nov. 1, 2016

(54) CLIENT APPLICATIONS COMMUNICATING VIA A USER TUNNEL

(71) Applicant: Apple Inc., Cupertino, CA (US)

(72) Inventors: Berkat S. Tung, San Jose, CA (US); Hyeonkuk Jeong, Saratoga, CA (US); Yan Yang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 14/475,526

(22) Filed: Sep. 2, 2014

(65) Prior Publication Data

US 2015/0350068 A1 Dec. 3, 2015

Related U.S. Application Data

(60) Provisional application No. 62/005,606, filed on May 30, 2014.

(51) Int. Cl.
| | |
|---|---|
| *H04J 3/04* | (2006.01) |
| *H04J 3/16* | (2006.01) |
| *H04L 12/721* | (2013.01) |
| *H04W 76/02* | (2009.01) |
| *H04L 29/06* | (2006.01) |
| *H04L 12/26* | (2006.01) |
| *H04W 80/06* | (2009.01) |

(52) U.S. Cl.
CPC ............ *H04L 45/70* (2013.01); *H04L 43/0811* (2013.01); *H04L 69/04* (2013.01); *H04L 69/16* (2013.01); *H04W 76/025* (2013.01); *H04W 80/06* (2013.01)

(58) Field of Classification Search
CPC ... H04L 45/70; H04L 69/16; H04L 43/0811; H04L 12/721; H04L 29/06; H04L 67/10; H04L 12/28; H04W 76/025; H04W 76/02; H04W 76/023; H04J 3/16; H04J 3/04
USPC ............. 709/202, 203, 207, 238, 240; 370/395.21, 469, 390, 426–429
See application file for complete search history.

(56) References Cited

U.S. PATENT DOCUMENTS

| | | |
|---|---|---|
| 2008/0043760 A1 | 2/2008 | Venkatraman et al. |
| 2011/0219129 A1* | 9/2011 | Allen .................. G06F 9/54 709/228 |
| 2012/0054851 A1 | 3/2012 | Piazza et al. |
| 2013/0170451 A1 | 7/2013 | Krause et al. |
| 2013/0304796 A1* | 11/2013 | Jackowski .............. H04L 47/19 709/202 |

OTHER PUBLICATIONS

International Search Report and Written Opinion mailed Aug. 11, 2015 in PCT/US2015/032560, 12 pages.

* cited by examiner

*Primary Examiner* — Hanh N Nguyen
(74) *Attorney, Agent, or Firm* — Kilpatrick Townsend & Stockton LLP; David B. Raczkowski

(57) ABSTRACT

Methods, systems, and apparatuses are provided for managing communication of data to/from a device. For example, multiple client applications running on the device can communicate to a second device through a same primary socket connection. A mux module can receive data from two different client applications over respective client connections. The received data can include header information identifying the second device as the destination. When the first data from a first client application is received at the mux module, the primary socket connection can be created; and when the second data from a second client application is received, the existing primary socket connection can be identified and re-used. The primary socket connection can be managed by a controller of the mux module.

30 Claims, 11 Drawing Sheets

CLIENT APPLICATIONS COMMUNICATING VIA A USER TUNNEL

CROSS-REFERENCES TO RELATED APPLICATIONS

The present application claims priority from and is a nonprovisional application of U.S. Provisional Application No. 62/005,606 entitled "CLIENT APPLICATIONS COMMUNICATING VIA A USER TUNNEL" by Tung et al. (Ref. No. P23188USP1), filed May 30, 2014, the entire contents of which are herein incorporated by reference for all purposes.

The present application is also related to U.S. Provisional Applications:
62/005,550 entitled "ANSWER AND HOLD WITH CLIENT AND HOST" by Rauenbuehler et al. (Ref. No. P23172USP1), filed May 30, 2014;
62/005,534, entitled "ANSWERING A CALL WITH CLIENT THROUGH A HOST" (Ref. No. P23171USP1), filed May 30, 2014;
62/005,565 entitled "PROXIED PUSH" by Pollack et al. (Ref. No. P23053USP1), filed May 30, 2014;
62/005,336 entitled "SMS PROXYING" by Circosta et al. (Ref. No. P23192USP1), filed May 30, 2014;
62/005,505 entitled "MANAGING CONNECTIONS OF A USER DEVICE" by Schobel et al. (Ref. No. P23295USP1), filed May 30, 2014;
62/005,565 entitled "APPLICATION-LEVEL ACKNOWLEDGEMENTS" by Pollack et al. (Ref. No. P23189USP1), filed May 30, 2014;
62/005,586 entitled "MESSAGES WITH ATTENUATING RETRANSMIT IMPORTANCE" by Pollack et al. (Ref. No. P23190USP1), filed May 30, 2014; and
62/005,799 entitled "PROTOCOL SWITCHING IN INTER-DEVICE COMMUNICATION" by Prats et al. (Ref. No. P22319USP1), filed May 30, 2014, which are hereby incorporated by reference for all purposes. The present application is also related to U.S. Provisional Application 61/953,591 entitled "DYNAMIC LINK ADAPTATION FOR IMPROVED LINK MARGIN," by Liu et al., filed Mar. 14, 2014, which hereby incorporated by reference for all purposes.

BACKGROUND

A mobile device (e.g., a smart phone or a tablet) can communicate with another device using various client applications. The other device can be a different mobile device, a non-mobile client computer, or a server. Multiple client applications on the mobile device can be communicating with multiple applications at another device at a same time. Such ongoing communication can be difficult to manage in an efficient manner. It is therefore desirable to provide new systems, methods, and apparatuses for managing the communications of a mobile device when running multiple client applications.

BRIEF SUMMARY

Embodiments of the present invention are directed to methods, systems, and apparatuses for managing communication of data to/from a device. In one embodiment, multiple client applications running on the device can communicate to a second device through a same primary socket connection. A mux module can receive data from two different client applications over respective client connections. The received data can include header information identifying the second device as the destination. When the first data from a first client application is received at the mux module, the primary socket connection can be created. When the second data from a second client application is received, the existing primary socket connection can be identified and re-used.

According to one embodiment, the mux module may include a controller (e.g., an UTun controller) that can manage the connections with the client applications and track any active primary socket connections with other devices. As an example, the connections with the client applications can be virtual TCP sockets, which can be managed via a TCP library in the kernel. These virtual TCP sockets can be correlated by the UTun controller to a particular device. In various embodiments, the UTun controller can manage messages and data stream, header compression, and encryption. In one embodiment, a link manager can select a particular link for sending data over the primary socket connection to a second device.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Multiple client applications on a mobile device can be communicating with multiple applications on another device at a same time. Typically, each client application on a mobile device would use a separate network connection to communicate with a client application on the other device. For example, each application can establish a network socket with another client application. However, the result is multiple network sockets being open between two devices when multiple applications are communicating on the two devices. The different network sockets can use a same wireless interface, but multiple network sockets would exist.

Embodiments can establish a primary socket connection between the two devices and have a multiplexing (mux) module that handles multiple intra-device connections. For example, a kernel of a first device can be part of a mux module, and establish TCP (Transmission Control Protocol) connections with various applications running on the first device. The kernel can communicate to a user tunnel (UTun) controller through an interface, and the UTun controller can establish the primary socket connection to the other device.

Various embodiments can handle streaming and messaging data, which may be handled differently. Incoming data in the primary socket connection can be demultiplexed and sent to an appropriate client application (e.g., according to a TCP or messaging header). UTun controller can manage priority of different intra-device connections, and then determine how and when to send out via the primary socket connection.

In various implementations, a link manager can determine which link layer protocol to use, e.g., which wireless interface (such as Bluetooth or Wi-Fi) and which transport layer protocol to use for communication between the link layers. Retransmissions can be disabled or otherwise not used for certain communications, e.g., when a particular link is assumed to be stable. A single encryption protocol can be used for all communications occurring via the primary socket connection. A control connection can be used to negotiate the encryption protocol. And, header information can be compressed, e.g., for the header information used in the intra-device connections.

I. Introduction

A general system diagram of various devices and servers that can be involved in embodiments of the present invention is first described. Later sections describe particular software modules that can manage communication of multiple client applications from one device to another.

A. Communication System

Figure 1:
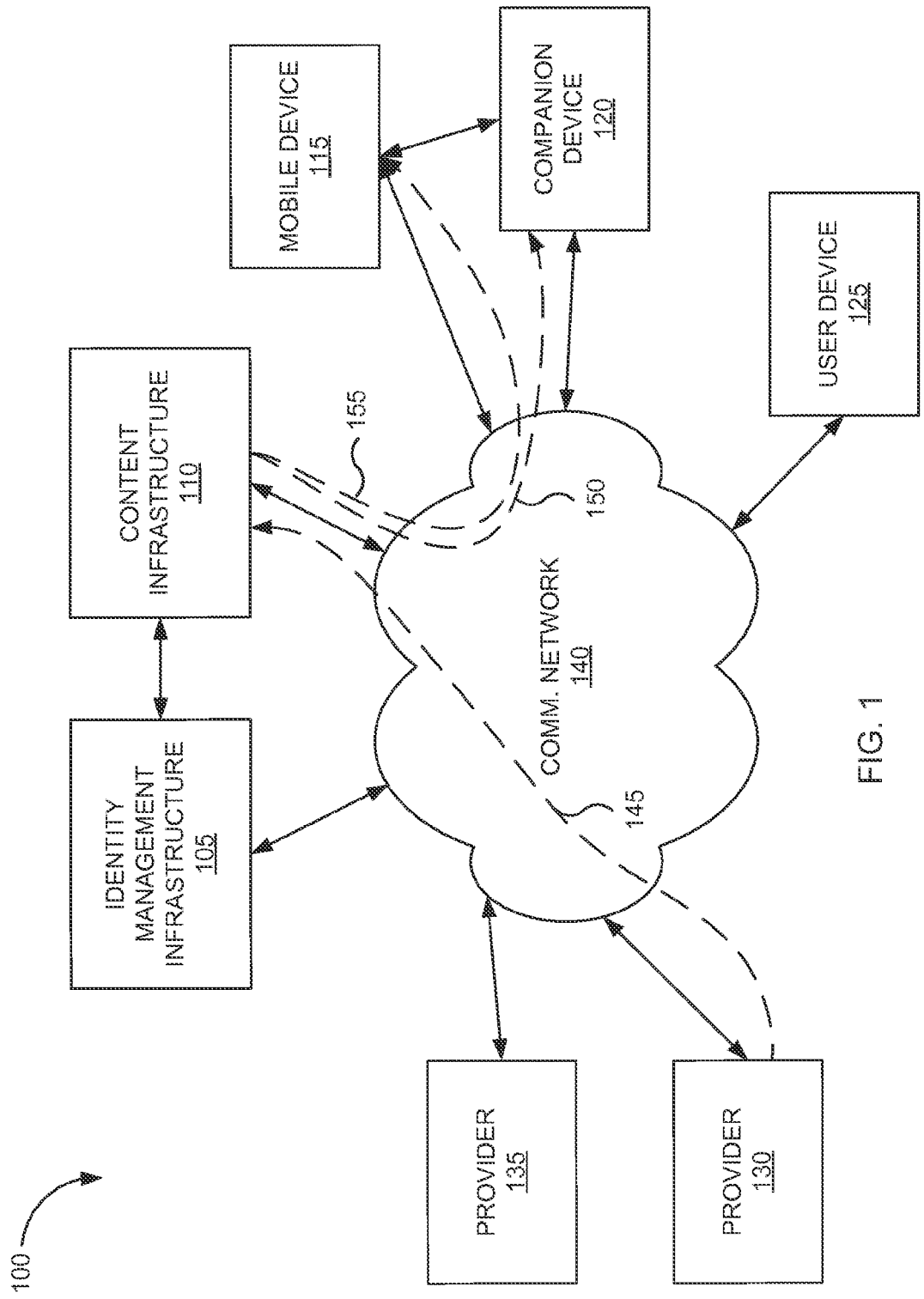
FIG. 1 is a block diagram of a system composed of one or more clients, hosts (e.g., a companion device), and servers communicating messages among each other according to various embodiments.

FIG. 1 is a block diagram of a system 100 according to various embodiments. FIG. 1 and other figures are merely illustrative of an embodiment or implementation of an invention disclosed herein should not limit the scope of any invention as recited in the claims. One of ordinary skill in the art may recognize through this disclosure and the teachings presented herein other variations, modifications, and/or alternatives to those embodiments or implementations illustrated in the figures. The devices in system 100 can include hardware and/or software elements.

In one embodiment, system 100 includes an identity management infrastructure 105 (i.e., one or more servers that implement an identity management service, authorization service, and/or authentication service), content infrastructure 110 (i.e., one or more servers that implement a voice/video call service, a messaging service, and/or a push notification service), mobile device 115, companion device 120, user device 125, provider 130, provider 135, and communications network 140. As illustrated, identity management infrastructure 105, content infrastructure 110, mobile device 115, companion device 120, user device 125, provider 130, and provider 135 are each capable of communicating with and through communications network 140 (representing the Internet, wide area networks (WANs), metropolitan area networks (MANs), local area networks (LANs), wireless area networks (WiLANs), radio access network (RANs), public switched telephone network (PTSN), etc., and/or combinations of the same). As illustrated, mobile device 115 can communicate directly with companion device 120 without utilizing communications network 140.

Identity management infrastructure 105 may be implemented in various embodiments using a single server computer system or may include multiple server computer systems, web servers, application servers, networks, interconnects, and the like. In various aspects, identity management infrastructure 105 provides management of individual entities, their authentication, authorization, and privileges within or across systems, such as content infrastructure 110. Identity management services provided by identity management infrastructure 105 can include technologies and services such as Active Directory, identity providers, password managers, access control providers, single sign-on (SSO) services, OAuth, security token services, or the like.

In various embodiments, identity management infrastructure 105 maintains information that authenticates the identity of a managed entity (such as a user, organization, and any associated devices, resources, services, applications, or the like). Identity management infrastructure 105 can verify that an entity is who/what it claims to be using a password, biometrics such as a fingerprint, a distinctive behavior such as a gesture pattern on a touchscreen, challenge-response protocols, one-time passwords (OTPs), 2-way authentications, and other techniques. Identity management infrastructure 105 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 105 can also manage descriptive information about managed entities and how and by whom that information can be accessed and modified.

In some embodiments, identity management infrastructure 105 creates digital identities for managed entities encompassing, for example, entity identifying information (PII) and ancillary information. In one aspect, a managed entity can have multiple digital identities and each digital identity can encompass multiple attributes. For example, a user can have a user identifier (e.g., a phone number, e-mail, etc.) that is linked to multiple devices. In addition to creation, deletion, modification of digital identities, identity management infrastructure 105 can manage ancillary entity data for use by services, such content infrastructure service 110.

In further embodiments, identity management infrastructure 105 can store capabilities of each device associated with a user identifier. Examples of device capabilities include whether a device includes a specific type or version of hardware, whether a device includes a specific type or version of software (e.g., operating systems or applications), whether a device is capable of performing a specific function such as placing and receiving phone calls or sending and receiving short message service (SMS)/multimedia message service (MMS) messages, whether a device is capable of maintaining connections with other devices, or the like. The list of devices associated with a user can be sent to and stored at any other device of that user, such as mobile device 115 and companion device 120 when associated with the same user identifier. Identity management infrastructure 105 can determine and collect capabilities of a device when it is registered and associated with the user identifier. Identity management infrastructure 105 can update the capabilities of a device periodically, for example, when the device re-registers or communicates with one or more services managed by identity management infrastructure 105.

In various embodiments, identity management infrastructure 105 can receive a single user identifier, which is used to determine device identifiers for devices associated with the user identifier. During entity registration, in order to access services or resources managed by identity management infrastructure 105, one or more user or other identifiers and a unique entity or device identifier (UID) may be combined to generate an entity or device token. In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 105, the token can be sent back to the entity. The entity in some aspects can then distribute the token to services or resources managed by identity management infrastructure 105 or other third party services for a variety of purposes relating to authentication, authorization, accounting, or the like of the entity at those managed services or resources or the trusted delivery of content to the entity by the third parties.

Content infrastructure 110 may be protected by and/or accessible to entities managed by identity management infrastructure 105. Content infrastructure 110 may be implemented in various embodiments using a single server computer system or may include multiple server computer systems, web servers, application servers, networks, interconnects, and the like.

Content infrastructure 110 can provide content to mobile device 115, companion device 120, and user device 125 as well as to other devices and entities. Examples of content include a text message, a multimedia message, an impending calendar event, an audio/video call (e.g., using VOIP), or a notification of new data on a remote server. In one embodiment, the content can originate from one or more sources managed by identity management infrastructure 105 or provided directly by content infrastructure 110. In other embodiments, the content can originate from other sources. For example, content may originate from any one of mobile device 115, companion device 120, user device 125, and providers 130 and 135.

In another example, content may be received from other sources such as the Internet, cellular networks, public switched telephone networks, and the like. Content infrastructure 110 can then route the content to mobile device 115, companion device 120, user device 125, and providers 130 and 135. In one embodiment, content infrastructure 110 may route through the infrastructure an SMS message received from or destined to a cellular network. In another embodiment, content infrastructure 110 may route through the infrastructure a voice call received from or destined to a public switched telephone network.

In some embodiments, the content sent to mobile device 115 can be forwarded to companion device 120 for delivery to mobile device 115. Companion device 120 can also act and send signals on behalf of mobile device 115. In these embodiments, companion device 120 acts as a main or intermediary device and mobile device 115 acts as a proxied device. Content infrastructure 110 can coordinate how and whether companion device 120 can act and send signals on behalf of mobile device 115.

In some embodiments, content infrastructure 110 can send content to more than one device, when appropriate. A user may be associated with both mobile device 115 and companion device 120. Content infrastructure 110 may route the content to both mobile device 115 and companion device 120, such as to have a VOIP phone call ring on both devices or to have a message appear in the inbox of the same application installed on both devices. In other embodiments, content is sent to only one device, e.g., to companion device 120, which may forward a call to mobile device 115. When a call is being forwarded to a device, a phone number can identify which device is to receive the phone/video call, and that device can relay a call as appropriate.

In one aspect, content can include of one or more pieces of data, such as a device identifier (or token) as discussed above and a payload. A device token can be provided in content originating from a provider (e.g., provider 130 and/or 135), a device of a same user (e.g., from either mobile device 115 or companion device 120), or a device of another user (e.g., user device 125), together with any payload the provider seeks to have delivered using content infrastructure 110. The device token can contain information that enables content infrastructure 110 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

An alert can come in a variety of forms. In one example, content can be displayed to a user as an alert message or other visual representation, such as a badge associated with an application icon. Availability of the content further can be announced by playing a sound when an alert or badge is shown. When a user is notified that an application or service has a message, event, or other content data for them, they can launch the application or service and see the details by either viewing the content, viewing information contained in a push notification, having the client application retrieve the referenced information, or the like. The user can also choose to ignore the notification, in which case the application is not activated.

As alluded to above, content infrastructure 110 can include push notification services that in addition to or in the alternative of routing content implement mechanisms to give client applications of push providers that are on user devices the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 110 through a persistent and secure channel. Identity management infrastructure 105 can ensure that the provider is authenticated (e.g., that the provider is who the provider alleges to be) and authorized to connect and utilizes content infrastructure 110 in a trusted manner.

While monitoring for incoming data intended for its client applications, when new data for an application arrives, the provider prepares and sends in one aspect a notification through its channel connection to content infrastructure 110, which pushes the notification to a push consumer or destination target device. Identity management infrastructure 105 can also ensure that the consumer or destination target device is authenticated and authorized to connect to and utilizes services of content infrastructure 110 in a trusted manner. A push consumer (or simply consumer or destination) can refer to an entity designated to receive information forwarded and/or delivered using content infrastructure 110. Although the above describes a provider as the originator of content or a notification of available content for the sake of simplicity, a provider in one instance may in turn become a consumer in another, and vice versa. Additionally, mobile device 115 may be a provider of content to companion device 120, and vice versa as well has provider 130 providing content to provider 135, and vice versa.

In one example of operation of content infrastructure 110, one or more server computers provide, provision, manage, and otherwise operate the push notification service for propagating information between provider 130, provider 135, mobile device 115, companion device 120, and user device 125. Each may establish at least one persistent connection (e.g., an accredited and encrypted Internet protocol (IP) connection) with content infrastructure 110 to originate and/or receive content over this persistent connection. As noted above, each and their connections can be authenticated and authorized by identity management infrastructure 105.

If a notification delivered by content infrastructure 110 for an application associated with a user's device arrives when the application is not running, the user's device may alert the user that the application has data waiting for it as discussed above. Content infrastructure 110 may also provide a default quality-of-service component that provides store-and-forward capabilities. If content infrastructure 110 attempts to deliver a notification but a target device is offline, the notification can be stored for a limited period of time, and delivered to the device when it becomes available. In some embodiments, all recent notification for a particular application is stored. In some embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for it may be discarded.

Provider 130 and provider 135 may be implemented in various embodiments using a single server computer system or may include multiple server computer systems, web servers, application servers, networks, interconnects, and the like. In various aspects, provider 130 and provider 135 provide client applications that run on mobile device 115, companion device 120, and user device 125 and server applications that provide one or more services to which the client applications can connect. Provider 130 and provider 135 may seek to notify the client applications accessible to one or more of mobile device 115, companion device 120, and user device 125 that information is available to their respective users.

In one aspect, a push provider is a software developer, company, or organization that maintains server software configured to interact with one or more client applications on one or more of mobile device 115, companion device 120, and user device 125. Provider 130 and provider 135 each connect with content infrastructure 110 through a persistent and secure channel while monitoring incoming data intended for their client applications. In one embodiment, provider 130 and provider 135 connect over a binary interface that provides a high-speed, high-capacity interface, e.g., using a streaming TCP socket design in conjunction with binary content. The binary interface may be synchronous or asynchronous. For each interface, TLS (or SSL) may be used to establish a secured communications channel.

Mobile device 115, companion device 120, and user device 125 may be each embodiment as a single device, a single computer system, multiple devices, or multiple computer systems. In various aspects, mobile device 115, companion device 120, and user device 125 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). As examples, a wearable device can be a wrist-worn device, a device that is clipped or pinned to the user's clothing, a device with a lanyard or chain that is wearable around the user's neck, a headband device, eyeglasses, or any other device that can be secured to the user's person or clothing.

In addition to or in the alternative, companion device 120 and user device 125 can be embodied as described above as well as being embodied as personal computer systems, mainframes, server computer systems, cloud services, or the like. Mobile device 115, companion device 120, and user device 125 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 3G, 4G, LTE, etc.).

In one aspect, mobile device 115, companion device 120, and user device 125 host one or more of a variety of client applications that communicate with one or more server applications provided by one or more providers (e.g., providers 130 and 135). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 110. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

As discussed above, mobile device 115, companion device 120, and user device 125 may receive an identifier (or device token) when a client application initially connects with content infrastructure 110 in order to receive push notifications. Providers 130 and 135 can use the token, or include the token, with any content or notification message so that it can be appropriately forwarded back to the device using content infrastructure 110. In various embodiments, to ensure trust, a provider communicates the token every time it connects with content infrastructure 110. Content infrastructure 110 can decrypt the device token and validate using identity management infrastructure 105 that the token was generated for the destination device. To validate in one embodiment, content infrastructure 110 ensures that the device identifier contained in the token matches the device identifier in a device certificate used when the device registered with identity management infrastructure 105.

Referring to an operation of system 100 illustrated in FIG. 1, in one embodiment, the operation can be to forward or otherwise communicate a notification message from provider 130 to companion device 120 as illustrated by paths 145 and 150. In various embodiments, provider 130 sends an authentication Secure Sockets Layer (SSL) certificate upon an initial connection with content infrastructure 110. Identity management infrastructure 105 can authenticate and authorize provider 130 as a registered and authorized sender of push notifications. This SSL certificate can also be configured with additional user-defined data. Identity management infrastructure 105 can utilizes the additional user-defined data to identify provider 130 in a trusted fashion. Other secure communications protocols (e.g., cryptographic protocols such as Transport Layer Security (TLS), etc.) can be used in other embodiments.

In some embodiments, where provider 130 is associated with a particular application (e.g., Email, Facebook, or Twitter) and includes additional identifying (e.g., user-defined) data within the SSL certificate, identity management infrastructure 105 can not only authenticate provider 130, but also automatically provision push service for provider 130 and the application utilizing content infrastructure 110. In other words, identity management infrastructure 105 can automatically extract any additional identifying data from the authentication certificate and have content infrastructure 110 attach the additional identifying data (or a portion of the data) to content (e.g., push-notification messages). In some embodiments, the additional identifying data may identify a topic or feed associated with provider 130 (or an application of provider 130) to which a user might subscribe via content infrastructure 110. Thus, the additional information in the authentication certificate can be leveraged to direct content to devices that have subscribed to the topic/feed or requested information regarding the topic/feed. In this way, push service is automatically provisioned for provider 130.

Once provider 130 is trusted, content infrastructure 110 receives the notification message from provider 130. As discussed above, the notification message may include a device token. Having received the notification message from provider 130, content infrastructure 110 determines the destination for the notification message. In various embodiments, the destination is determined based on the device token that is sent along with notification message. In some embodiments, it is not necessary to send destination information as part of a token. By determining or extracting the destination from the device token or otherwise obtaining destination information for the content, content infrastructure 110 can then determine whether the destination is "online" or otherwise accessible.

If the destination is online, in one embodiment, content infrastructure 110 may then route the notification message to the destination companion device 120 illustrated by path 150, for example, via a persistent connection maintained by companion device 120 with content infrastructure 110. If the destination is "offline" or otherwise inaccessible to content infrastructure 110, the content may be stored and delivery retried at a later time. Content infrastructure 110 can in addition to or alternatively route the notification message to mobile device 115 illustrated by path 155, for example, via a persistent connection maintained by companion device 120 with content infrastructure 110. Content infrastructure 110 thus can route content to a single device, multiple devices at the same time, or to one device for delivery to another device.

B. Content Infrastructure

Figure 2:
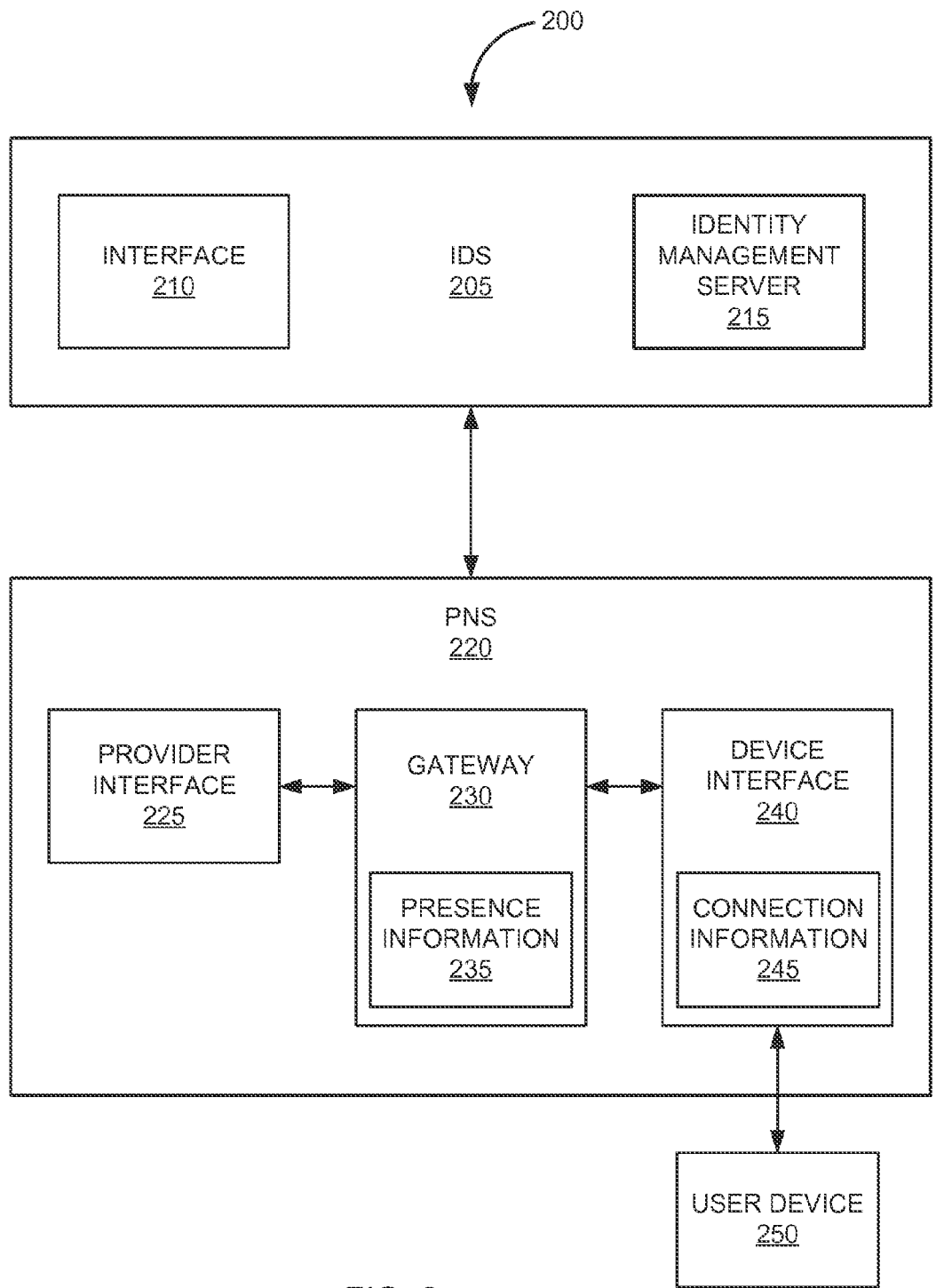
FIG. 2 is a block diagram of system that provides push notification services according to various embodiments.

FIG. 2 is a block diagram of system 200 that provides push notification services according to various embodiments. System 200 may be implemented in various embodiments using a single server computer system or may include multiple server computer systems, web servers, application servers, networks, interconnects, and the like. System 200 can be embodied as content infrastructure of FIG. 1 in various embodiments.

In particular, FIG. 2 illustrates various examples of forwarding content (e.g., notification messages and phone/video calls) between devices, e.g., between providers and mobile devices, or between a sending device of one user and receiving devices of another user). In these examples, system 200 is shown with identity services (IDS) 205 having interface 210 and identity management server (IMS) 215 and push notification services (PNS) 220 having provider interface 225, gateway 230 having presence information 235, device interface 240 having connection information 245, and user device 250. Each service may be implemented using hardware and/or software elements.

In one aspect, IDS 205 may be embodied as or form part of identity management infrastructure 105. IDS 205 may be implemented in various embodiments using a single server computer system or may include multiple server computer systems, web servers, application servers, networks, interconnects, and the like. Interface 210 can enable an entity (e.g., mobile device 115 or provider 130) to connect (e.g., via a network) in order to take advantage of service provided by IDS 205. Interface 210 may incorporate load balancing and other connection management techniques allowing entities to communicate with Identity management server 215.

In one embodiment, an entity sends information such as an authentication certificate that is received via interface 210 upon an initial connection to IDS 205 or to a service, resource, or application managed by IDS 205 (e.g., PNS 220). Identity management server 215 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 220, entities and their devices may be required to possess certain certificates, certificate authority (CA) certificates, or tokens.

In one embodiment, each provider of content uses a unique provider certificate and private cryptographic key for validating their connection with PNS 220. This certificate can be provisioned by identity management server 215 and identify the provider and/or a particular topic published by the provider. In general, the topic is a bundle ID of a client application. The provider may optionally wish to validate the service, to which the provider is connected, using a public server certificate provided by PNS 220. In various aspects, the provider uses the public server certificate passed to it by identity management server 215 when registering to authenticate the service to which the provider has connected.

Identity management server 215 may also issue to each device, which desires to receive content, a unique private key and certificate that the device uses to authenticate itself to identity management server 215 and establish a connection to PNS 220. A device usually obtains a device certificate and key from identity management server 215 during device activation and stores them in a keychain. The device also holds its particular device token, which it receives during the service connection process. Each client application that utilizes PNS 220 is responsible for delivering this token to its content provider.

Identity management server 215 may store any necessary certificates, CA certificates, and cryptographic keys (private and public) for validating connections and the identities of providers and devices.

In this example, once the entity is trusted, system 200 allows the entity to utilize push notification services provided by PNS 220. PNS 220 may be implemented in various embodiments using a single server computer system or may include multiple server computer systems, web servers, application servers, networks, interconnects, and the like. The entity may be a provider or other notification provider desiring to connect with PNS 220 (e.g., via a network). As alluded to above, in one embodiment, provider interface 225 provides a high-speed, high-capacity interface allowing push notification providers to communicate with PNS 220. Provider interface 225 may incorporate load balancing and other connection management techniques allowing entities to communicate with PNS 220. Although provider interface 225 is shown as being linked to gateway 230, provider interface 225 may be incorporated into gateway 230 or device interface 240. As discussed above, a user device can be a provider of content in various embodiments as well as be a destination of content routed using PNS 220.

Gateway 230 may be implemented in various embodiments using a single server computer system or may include multiple server computer systems, web servers, application servers, networks, interconnects, and the like. Gateway 230 can determine the destination of content (e.g., push messages) received via provider interface 225 or device interface 240. In various embodiments, gateway 230 can determine a destination based on presence information 235. In one aspect, presence information 235 is maintained using a device's push token. Accordingly, when a push notification is received at gateway 230 directed to a particular push token, gateway 230 can perform a lookup to determine whether there is a TCP socket descriptor associated with that push token. The socket descriptor can provide the TCP socket information and other networking information needed to transmit the push notification. In various aspects, presence information 235 includes mappings between authenticated entities and their connections to PNS 220. These connections can be utilized by PNS 220 for delivering content, notifications, and the like or otherwise communicating with an entity. Each mapping may be indicative of at least one entity and at least one connection mechanism to that entity, such as a network socket connection or other connection identifier. For example, a mapping may identify a destination device by its device token or a provider by its provider identifier. Additional information may be included in each mapping in order to facilitate communication with the entity's device.

In some embodiments, in order to scale handling of connections from an increasing number of users, devices, and providers utilizing services of PNS 220, device connections in presence information 235 (or the devices themselves) may be managed according to at least one grouping or logical partition called a zone. Functions performed by gateway 230 may be partitioned out to multiple servers that are assigned dynamically to handle these groupings or zones. For example, one or more servers might manage, for a period of time, delivery to destinations assigned to one zone and then be switched, or reconfigured, to manage the delivery of notifications to destinations assigned to a different zone at a later time. Each of these servers may also include routing information that is used to route content to other servers associated with a particular zone of the destination of the content. Thus, when content is received at one server, another server designed to handle a predetermined zone is determined and the content can be forwarded to the appropriate server. In one aspect, functions performed by gateway 230 may be partitioned out to multiple servers to handle corresponding device connections (e.g., device interface 240).

In various embodiments, gateway 230 is linked to device interface 240. Device interface 240 provides an interface to communicate with user device 250. Device interface 240 may incorporate load balancing and other connection management techniques allowing devices to communicate with PNS 220. Although device interface 240 is shown as being linked to gateway 230, device interface 240 may be incorporated into gateway 230 or provider interface 225.

Device interface 240 in these examples allows presence information 235 to be generated when device interface 240 is connected to user device 250. User device 250 can assert its presence to PNS 220 upon establishing a persistent connection. Device interface 240 then generates a device/connection mapping in connection information 245. Device interface 240 can back-propagate connection information 245 to gateway 230 allowing gateway 230 to generate a device/connection mapping in presence information 235. In one aspect, presence information 235 includes a device/courier mapping or link allowing gateway 230 to determine an appropriate courier that acts as device interface 240 connected to user device 250. The courier utilizes connection information 245 (including any device/connection mappings or links) allowing the courier to determine connection information specific to user device 250 that can be used to deliver content to user device 250. In another aspect, presence information 235 and connection information 245 may be substantially identical in that they include correspondences between a given device and its connection with PNS 220.

In various embodiments, a device wishing to receive content via PNS 220 sends authentication information either upon an initial connection with device interface 240 or directly to IDS 205. Identity management server 215 can receive the authentication information either directly or indirectly and then authenticate and authorize the device or its associated user or organization as a registered and authorized entity. Once the device is trusted, PNS 220 is informed and PNS 220 thereafter manages any connections made between the device and PNS 220 (such as with device interface 240 in connection information 245). Device information available at device interface 240 in connection information 245 can be periodically back-propagated to gateway 230 to generate or update presence information 235.

When the device initially connects with PNS 220, PNS 220 provisions the device. In various embodiments, a zone is provisioned for the device as alluded to above. Despite a particular zone assignment for each device, devices may lose their connection with device interface 240 for various reasons. For example, a connection might be lost due to loss of cellular signal, or wi-fi signal, loss of power, or because a mobile device has changed geographic locations, etc. In other aspects, a connection may be intermittent as opposed to being persistent in order to conserve power or achieve other efficiency metrics.

When user device 250 attempts to reconnect to PNS 220, user device 250 can connect with any courier acting as device interface 240. In embodiments where device connections are assigned to at least one grouping or zone, device interface 240 may provision a connection with one or more servers of gateway 230 that are assigned to handle the zone of a connecting device. For example, if device interface 240 is connected to user device 250 that is assigned to zone 1, then device interface 240 can provision a connection with one or more servers responsible for managing zone 1. Device interface 240 may then back-propagate device information for user device 250 to the one or more servers responsible for managing zone 1. In similar fashion, device interface 240 may make connections with servers of different zones to back-propagate specific device information for devices associated with those respective zones ensuring that no matter where or how user device 250 connects to PNS 220, presence information 235 is up to date and available to determining how to route the content. In some embodiments, device interface 240 can be specific to a wireless carrier or internet service provider (ISP) allowing PNS 220 to support the protocols or physical connections specific to multiple third party entities.

According to one example, when gateway 230 receives content from provider interface 225, gateway 230 forwards the content received from provider interface 225 to device interface 240 based on its mappings in presence information 235. Device interface 240 can deliver the content received from gateway 230 to user device 250 for which information about a persistent connection is maintained in connection information 245.

Upon receiving content from gateway 230, device interface 240 can perform a lookup or otherwise consult its device connections in connection information 245 and send the content received from gateway 230 to the appropriate device, for example, over the persistent connection associated with user device 250. In one aspect, device interface 240 inspects the device token associated with the content to be delivered and determines whether a match is found between the device token and the connections that device interface 240 manages in connection information 245. Device interface 240 can deliver the content using the connection established by the device having the given device token.

In one example of operation, user device 250 subscribes to a particular application managed by a provider and desires to receive notification messages for that application via PNS 220. Thus, user device 250 calls the provider either directly via a communications network or utilizing PNS 220 and transmits its device token to the provider. The device token or its transmission may include not only a device's identification information but may include an encrypted combination of a device's UID and its zone identifier allowing PNS 220 to provision connection information for the device according to the appropriate resources allocated to the zone.

When the provider sends a notification message to the particular application on user device 250, the provider connects to PNS 220 using provider interface 225 and sends the message to gateway 230. Even if user device 250 is associated with a particular zone, the provider does not need to connect to any particular gateway of PNS 220 to successfully push a notification message to user device 250. For example, if gateway 230 receives content from provider interface 225 and the content has a device token, gateway 230 will look at the token and either route the message to an appropriate server of PNS 220 (which may route the message to device interface 240 or another courier of PNS 230) or route the message directly to device interface 240.

If gateway 230 is the designated gateway, gateway 230 sends/forwards the message to device interface 240 based on its device/courier mapping in presence information 235 in some embodiments. Device interface 240 is then able to lookup its connections in connection information 245 and send the message to the device over the persistent connection established by the device with device interface 240. In summary, in cases where PNS 220 receives a message having a particular destination, a gateway of PNS 220 forwards that message directly to an appropriate courier of PNS 220 using a device/courier mapping that was established when a device connects to PNS 220. In further embodiments, gateway 230 can send/forward the message directly to user device 250 based on its device/connection mapping in presence information 235. Gateway 230 can generated this mapping information from various sources to each of which a device has established a connection.

II. Communication Stack on Mobile Device

The communication of data from a device (e.g., mobile device 115 or companion device 120) can occur through various protocols (e.g., 802.11 protocols, Bluetooth protocols, and near field communication (NFC) protocols). To determine which protocol to use, a device can include a link manager for determining which protocol to use for a particular application, and thus which driver path data should be sent. A lower level link layer can also perform selections of a particular protocol to use. Further, a user tunnel (UTun) controller can coordinate a plurality of virtual connections with various client applications to communicate over a common socket connection with another device (e.g., mobile device 115 communicating with companion device 120).

Figure 3:
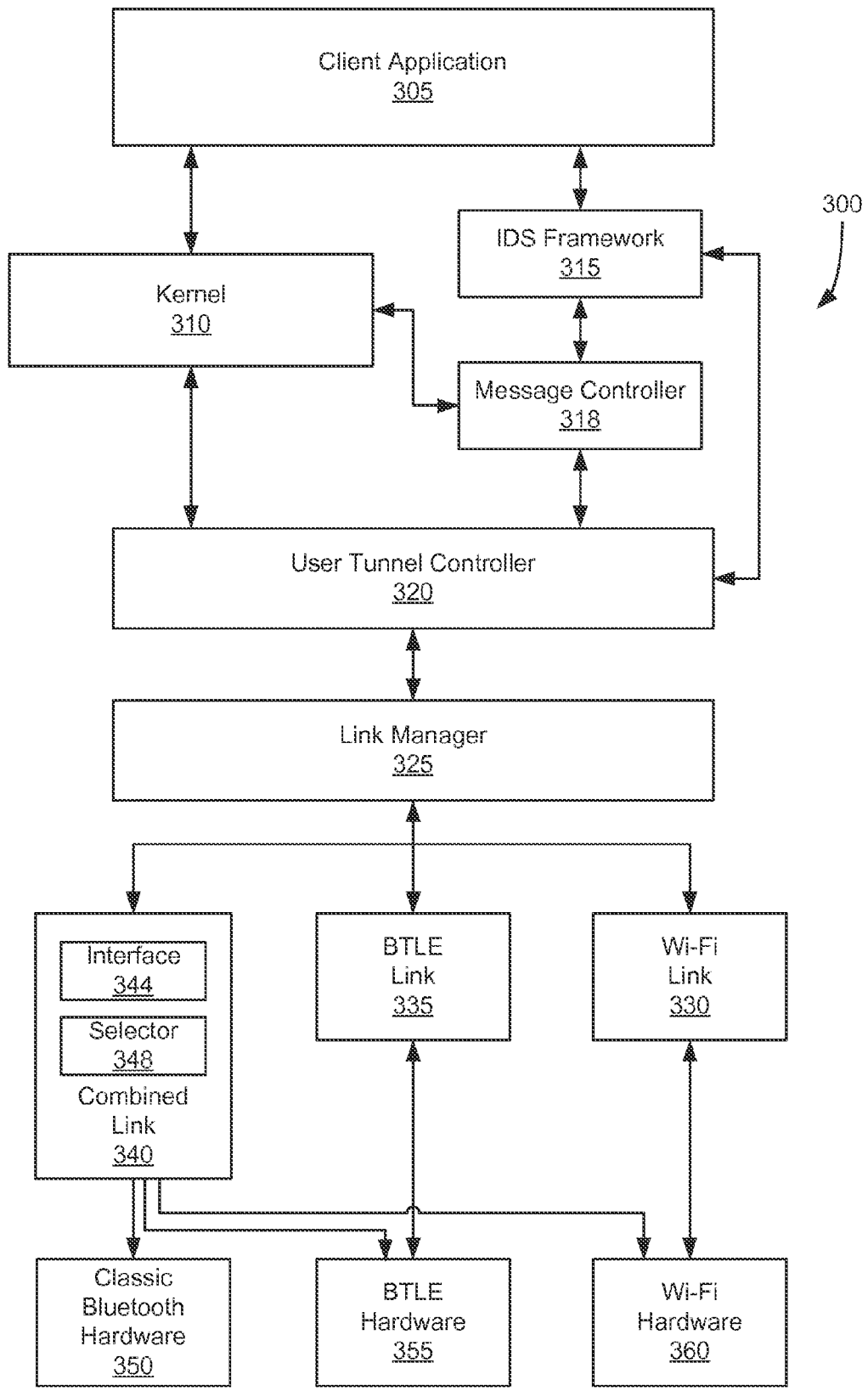
FIG. 3 shows a protocol stack for communicating data according to embodiments of the present invention.

FIG. 3 shows a protocol stack 300 for communicating data according to embodiments of the present invention. Various modules in protocol stack 300 can be omitted, or other modules added. The software modules can be run on a same processor or different processors. Although only a few communication protocols are listed, numerous wireless protocols can be used. For example, Bluetooth protocols can include Basic Rate (BR), Enhanced Data Rate (EDR), and Low Energy (LE) options. Bluetooth BR/EDR is also referred to as Classic Bluetooth.

In some embodiments, a client application 305 on the device (e.g., mobile device 115) can request data to be sent to another device (e.g., companion device 120). The request can specify the other device via any suitable identifier, e.g., an account name, an IP address, a MAC address, etc. The request can be before or after the device determines that the other device is within communication, e.g., as determined by initial signaling, such as a handshake. The data (e.g., in a message or a stream) can be sent any suitable application layer protocol, such as HTTP, RTP, SMTP, MGCP, etc. The other device can be any device, including another device of the user. The request can made be in response to an action by the user, an internal event (e.g., based on time or other criteria) that may be in a same or other application (e.g., a calendar app), or an external event (e.g., in response to a message from another device). An example of an event is a syncing event.

Before sending data, client application 305 can submit an open socket request (e.g., in a streaming example). The socket request can use information from an identity services (IDS) framework 315, which can provide an address (or other type of ID) for the other device. For example, client application 305 can know account information for the second device (e.g., account information of a different or same user), and IDS framework 315 can store a list of device IDs for a particular account. IDS framework 315 can be in communication with identity management infrastructure 105 to obtain the list. Thus, IDS framework 315 can store or otherwise obtain device IDs (e.g., addresses) for all devices that a user has registered with ID infrastructure 105. For example, IDS framework 315 can request via an IDS daemon to ID infrastructure 105 to obtain the device IDs. In one implementation, the socket request can be made to kernel 310.

In a messaging example, the request to send data can go to IDS framework 315 to obtain a device ID, which can be sent to message a message controller 318 and a user tunnel (UTun controller 320). UTun controller can establish a mapping between the device ID and an IP address (e.g., a virtual IP address) when the device ID is not an IP address. A socket can be created between message controller 318 (which assigns a device ID to the socket) and kernel 310 (which can assigns an address to the socket, such as a virtual IP address). UTun controller can be used to create the socket connection between message controller 318 and kernel 310. In this manner, the send-date request from client application 305 does not need to include a device ID, but can specify an account, which can then be cross-referenced by IDS framework 315 with known devices of the account and their capabilities (e.g., if the request requires certain capabilities). Given that a device ID can be obtained, a pairing does not need to occur prior to creating the socket.

In various embodiments, IDS framework 315 can receive a particular port/service at the other device from client application 305, determine the port/service based on information obtained from ID infrastructure 105, or determine the port/service from a token sent in the request. IDS framework 315 can then communicate a device ID and other header information to message controller 318 and/or UTun controller 320. IDS framework 315 and UTun controller 320 can communicate via cross process communication (XPC). UTun controller 320 can be part of an IDS daemon, and can receive a device ID from ID infrastructure 105.

As mentioned above, UTun controller 320 can create a virtual address that corresponds to the actual device address, where the virtual address can be used to create a virtual socket. A virtual socket can also be created using any device ID (e.g., an actual address of a device or other ID). As an example, a socket can be created for communication between client application 305 and kernel 310 (e.g., in a streaming context), where kernel 310 can have various sockets open with various client applications. Kernel 310 can have a single connection to UTun controller 320 for the other device and multiplex (mux) the data from various client applications into the single connection. Instead or in addition, UTun controller 320 can also perform the muxing, e.g., if multiple socket exist between kernel 310 and UTun controller 320 for various client applications to the other device. Incoming data can be demultiplexed (demuxed) for sending to the destination client application.

As another example, a socket can be created between kernel 310 and message controller 318 (e.g., in a messaging context), where a socket can be created for each destination device, with different sockets to a same device potentially having different priorities. Thus, a particular virtual socket can be associated with a particular device and a particular priority (e.g., high and low). Message controller 318 can have various connections to various client applications. Thus, message controller 318 can provide mux/demux capabilities.

UTun controller can create a primary socket with the other device. When UTun controller 320 receives data using a virtual connection associated with the second device, it can then map the virtual connection to the primary socket for communicating with the other device. All data for the other device can then be sent out through the primary socket. The virtual address for a virtual socket can be passed back to client application 315, e.g., in the stream context. In one embodiment, a virtual socket involving kernel 310 is a TCP socket. The virtual address can have a same format as a regular address, e.g., an IPv6 address. A mux module can include any combination of kernel 310, message controller 318, and UTun controller 320.

When client application sends data, client application 305 can use the virtual socket to send data to kernel 310. For example, the data can be sent using TCP via the virtual socket. Kernel 310 can implement an UTun interface for communicating with UTun controller 320. Kernel 310 would pass the data (e.g., with a TCP header) and the virtual socket identifying the virtual address to UTun controller 320, which would then use the virtual address to resolve the device address for determining the device socket.

When sending to the data over the device socket, a link manager 325 can determine which link to use. A link can be a particular combination of a wireless interface protocol (e.g., Bluetooth or Wi-Fi), a transport protocol (e.g., TCP, UDP, etc.), and a destination device. In this manner, UTun controller 320 does not need to know how the data is being sent, but instead can simply send the data to link manager 325.

In various embodiments, the determination by link manager 325 can be made per data packet, per set of data packets, per device socket, and may change from one data packet to another. Link manager 325 may then select a link for sending the data. In the example shown, a Wi-Fi link 330 provides software drivers for communicating with one or more Wi-Fi protocols, and BTLE link 335 provides software drivers for communicating with Bluetooth LE. Wi-Fi link 330 is in communication with Wi-Fi hardware 360, and BTLE link 335 is in communication with BTLE hardware 355. Wi-Fi link 330 can be used for various Wi-Fi protocols, such as infrastructure Wi-Fi. In one embodiment, link manager 325 can try all links to determine whether any of the links can contact the other device, and then use a connected link with a highest predetermined rank or dynamic rank.

Hardware 350-360 can be in communication with links assigned to various devices. For example, links 330, 335, and 340 can be assigned for communication with a second device. And, other links that are assigned for communication with a third device can also be in communication with hardware 350-360. When a particular hardware receives data, software can identify a particular sending device and then determine the corresponding link, e.g., using header information to determine the link corresponding to the sending device and transport protocol.

In some embodiments, a combined link 340 can include an interface 344 for communicating with link manager 325 and a selector 348 that selects a particular protocol to use. The protocols can be the same or different than that available to link manager 325. Selector 348 can perform similar functions as link manager 325 in that a particular link is selected. However, link manager 325 and selector 348 can use different criteria for determining which link to use. For example, link manager 325 can determine to use combined link 340, and selector 348 can then determine that BTLE hardware 355 is to be used. The hardware can be contained on a same chip or on separate chips.

One or more protocols can be only available via combined link 340, such as classic Bluetooth hardware 350. Link manager 325 and selector 348 can use various criteria for determining which link to use, such as power usage of a link, speed of a link (e.g., real-time data rate), and signal strength of a link. A goal of the optimization for selecting a link can be to provide a minimal data rate at a lowest possible energy. Other details about methods and criteria for selecting a link and hardware can be found in U.S. Provisional Application No. 61/953,591, entitled "Dynamic Link Adaptation For Improved Link Margin" (Ref. No. P22725) and filed Mar. 14, 2014, which is incorporated by reference.

III. Multiplexing

As described above, multiple connections from various client applications can be sent over a single primary socket connection. For example, the client applications can use TCP sockets and send data in a normal way that the client application is configured to do. But, the TCP connections can be combined into the primary socket, which can communicate over a single UDP link, or over various links that are used to implement the primary socket.

A. Generalized Muxing

Figure 4:
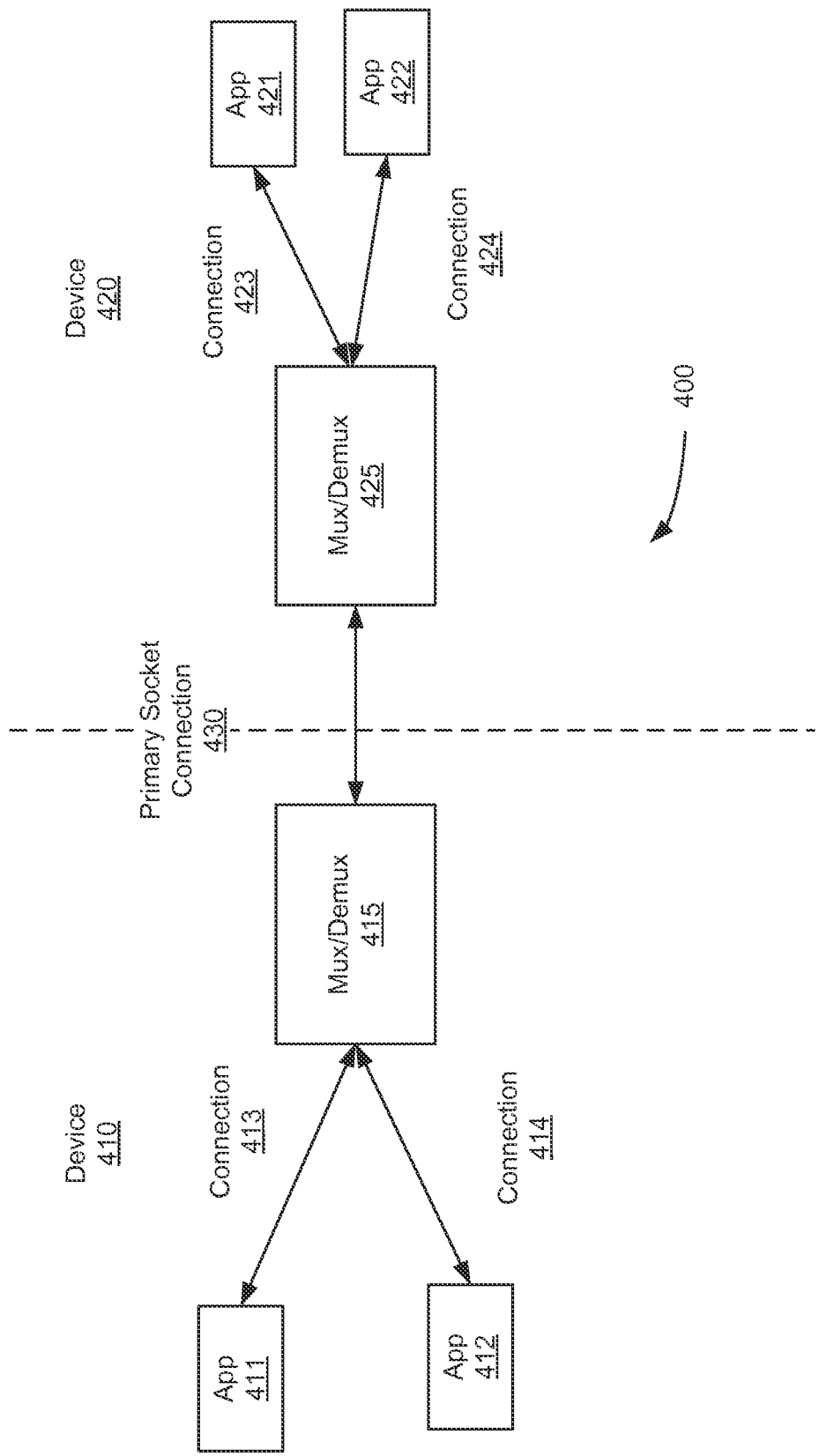
FIG. 4 is a block diagram of a system illustrating multiplexing (muxing) and demultiplexing (demuxing) of connections of client applications according to embodiments of the present invention.

FIG. 4 is a block diagram of a system 400 illustrating multiplexing (muxing) and demultiplexing (demuxing) of connections of client applications according to embodiments of the present invention. System 400 includes a device 410 and a device 420. A primary socket connection 430 handles the communication of data between device 410 and device 420.

Two client applications 411 and 412 are shown running on device 410. A mux/demux module 415 has a connection 413 with application 411, and has a connection 414 with application 412. In one embodiment, connections 413 and 414 can be TCP sockets. Two client applications 421 and 422 are shown running on device 420. A mux/demux module 425 has a connection 423 with application 421, and has a connection 424 with application 422.

In various embodiments, mux/demux module 415 can include a kernel (e.g., 310), a message controller (e.g., 318), and a user tunnel (UTun) controller (e.g., 320), or any combination thereof. For example, a kernel can establish TCP sockets with the client applications. As another example, a message controller can establish message connections with the client applications.

For an example of data being sent from application 411 to application 421, application 411 can request a socket for device 420. As described above, an IDS framework can be used to determine a device ID that can be used in creating connection 413. In this example, connection 413 is dedicated for communications with device 420. In one implementation (e.g., in a messaging context), connection 413 can include two subconnections: a first persistent subconnection (e.g., between a message controller in the client application) and a second device-specific connection (e.g., between the message controller and an UTun controller, which may be via a kernel).

Mux/demux module 415 can receive the data, along with information identifying a destination (e.g., a destination address and a destination port that specifies the particular application on device 420. Mux/demux module 415 can resolve any mapping between a virtual socket and primary socket connection 430, e.g., using a mapping between a virtual address and a device ID. Mux/demux module 415 can include a link manager for determining which link to use in sending data over primary socket connection 430. Different data from a same or different connection can be sent over different links, while still using primary socket connection 430. Depending on which link is chosen, the data can be sent in various forms of data packets.

Mux/demux module 425 can receive data packets along primary socket connection 430. A first layer of header information can be used to identify which link the data packets are destined, e.g., the header information can identify device 410 as the sending device that is assigned to a particular link. The first layer of header information can be discarded.

A second layer of header information can be used to identify the client application (e.g., 421), and thus mux/demux module 425 can send the data packet across the appropriate connection (e.g., 423) to the specified application (e.g., 421). In some embodiments, a multilayer of header information can be used, e.g., in a messaging context. For instance, the second layer can specify a particular socket connection between the kernel (e.g., in mux/demux module 425) and a message controller. Then, the third layer of header information can specify the particular application. Accordingly, each successive layer of header information can be used to determine where or which socket to send the remaining payload. And, each layer of header information can be for any one of various transportation layer protocols (e.g., TCP, UDP, or a messaging protocol).

In one embodiment (e.g., for a stream), there can be one single UDP link between device 410 and device 420. Multiple sockets can exist from any port (e.g., any client application), and that data can be sent over the one UDP link. In one implementation, ports are not used in the UDP header (just device to device), and a TCP header can specify the port. In other embodiments, various links can be used simultaneously to implement primary socket connection 430.

Figure 5:
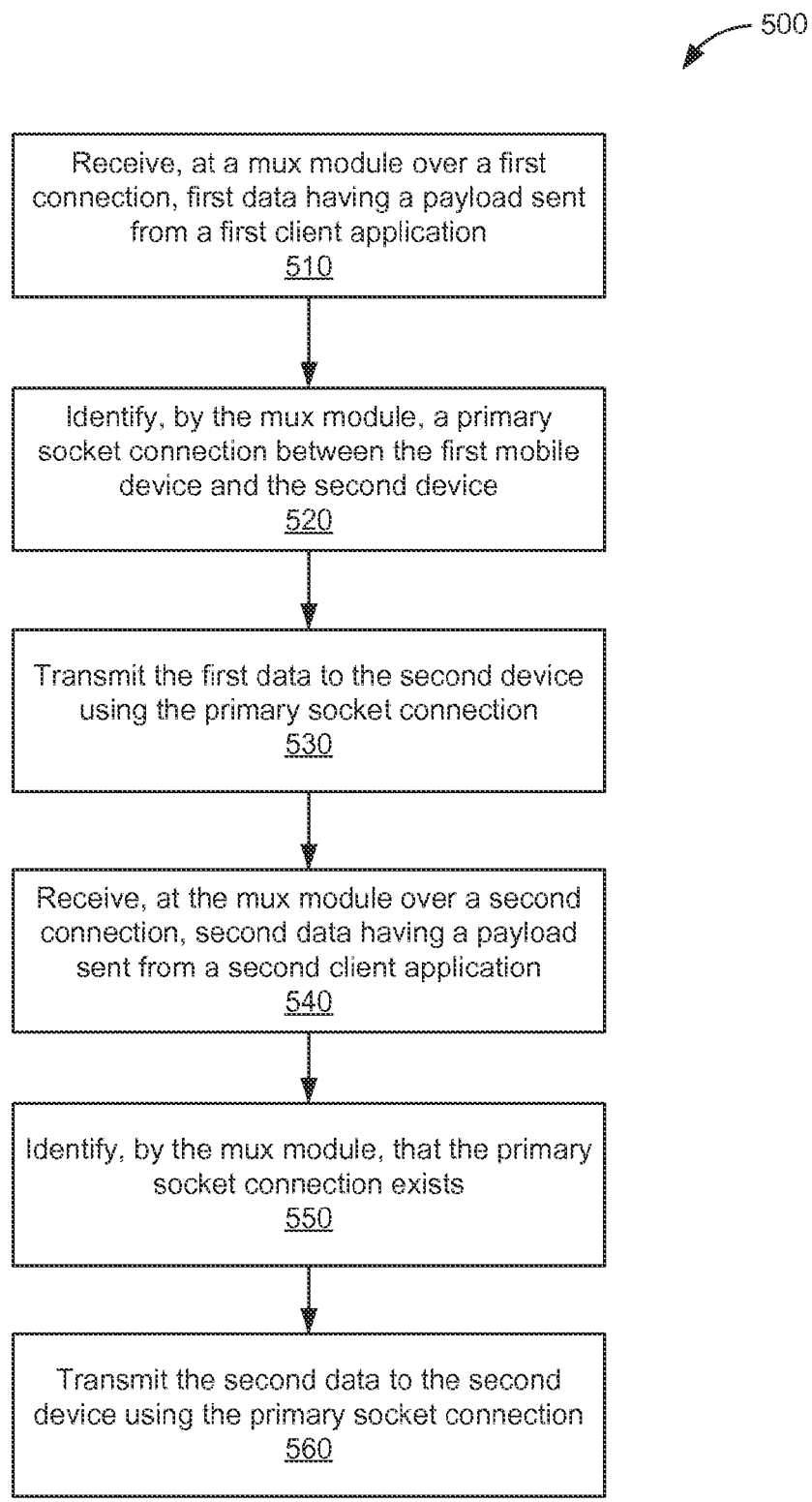
FIG. 5 is a flowchart of a method for sending data from a first mobile device to a second device according to embodiments of the present invention.

FIG. 5 is a flowchart of a method 500 for sending data from a first mobile device to a second device according to embodiments of the present invention. Method 500 can be performed by a first mobile device that has a user interface, one or more wireless interfaces, and one or more processors coupled to the one or more wireless interfaces and the user interface.

At block 510, a mux module receives first data over a first connection. The first data has a payload sent from a first client application executing on the one or more processors, and the first data includes first header information identifying a second device as a destination for the first data. In a messaging example, a message controller (which can be part of the mux module) can receive a message from the first client application. The message controller can add header information according to a messaging protocol, if the data does not already include such header information or if the header is not formatted according to the messaging protocol. In a stream example, a socket connection can be established for the second destination, and the data stream can be specified for that socket, thereby identifying the second device as the destination.

At block 520, the mux module identifies a primary socket connection between the first mobile device and the second device. In one embodiment, the mux module can create the primary socket connection if it does not exist already. The identification would be part of the creation of the primary socket connection. In another embodiment, the primary socket connection may already exist, and can be identified by searching a list of open sockets for one that matches to the second device.

At block 530, the first data is transmitted to the second device using the primary socket connection. The first data can be transported according to various links (e.g., with different protocols and interfaces). For instance, the first data can be transported via a network, e.g., using Wi-Fi and a suitable transportation layer protocol (e.g., UDP or TCP). In another implementation, the first data can be transported using a peer-to-peer communication, e.g., using a Bluetooth protocol. In one embodiment, the first data can be sent as different data packets, with different data packets being sent over different links. Depending on the link used, additional header information can be added.

At block 540, the mux module receives (over a second connection) second data having a payload sent from a second client application executing on the one or more processors. The second data includes second header information identifying the second device as the destination for the second data. The second application is different than the first application, and can send data independently from the first application. The second data and the first data can have the same form, e.g., both be messages or both be part of a stream.

At block 550, the mux module identifies that the primary socket connection exists between the first mobile device and the second device. The mux module can track existing primary socket connections to other devices, e.g., using a data structure, such as a table. For example, the mux module can search a data structure that identifies active primary socket connections associated with the particular other device. If the second header information identifies a second device that is associated with an active socket, then that socket can be identified as already existing, and a new socket does not need to be opened.

At block 560, the second data is transmitted to the second device using the primary socket connection. Thus, the first data and the second data are transmitted using the same socket, even though they are sent by different applications. The second device can identify the different header information to route the data to the desired application running on the second device.

B. Streaming

Figure 6:
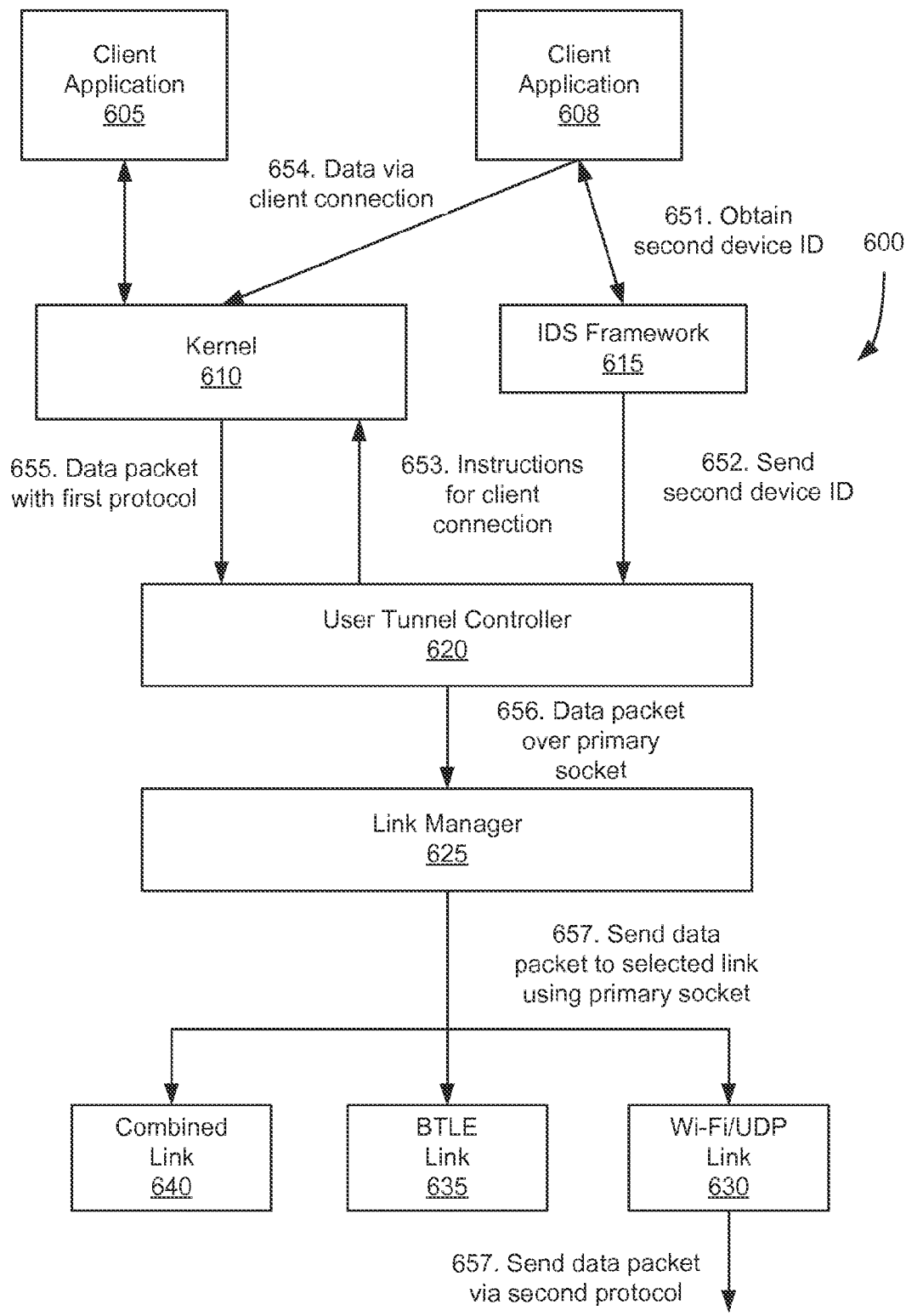
FIG. 6 shows an example process flow for a stream for a protocol stack according to embodiments of the present invention.

FIG. 6 shows an example process flow for a stream for a protocol stack 600 according to embodiments of the present invention. Two client applications 605 and 608 are executing on a first device. In step 651, client application 608 can request and obtain a device ID for the second (recipient) device. IDS framework 615 (which can be running within client application 308) can have the device ID (e.g., associated with an account name) or obtain it from an IDS server. Each client application can include IDS framework or communicate with a same IDS framework shared by other applications.

In step 652, the second device ID is communicated to UTun controller 620, which can facilitate the creation of a client connection for client application 608. For example, UTun controller can map the device ID to a TCP socket. UTun controller can then help to create a TCP socket between client application and kernel 610.

In step 653, UTun controller can send instruction to kernel 610 to create the client connection with client application 608 (e.g., to create a TCP socket). The instructions can include a virtual address (e.g., in IPv6 format) for creating the TCP socket, where the virtual address is mapped to the device ID. Such a mapping can be implemented in various ways. Kernel 610 can provide the client connection information to client application 608.

In step 654, after the client connection is created between client application 608 and kernel 610, client application 608 sends data to kernel 610 over the client connection. Kernel 610 can process the data into data packets according to any suitable transport layer protocol, e.g., TCP. As part of the processing, a first layer of header information is included in the data packets, where the header information includes the virtual address.

In step 655, kernel 610 can send the data packets to UTun controller, which can use the virtual address to determine the device identifier and determine whether a primary socket exists. UTun controller can create a primary socket at any time before this point, e.g., when the second device ID was obtained in step 652.

In step 656, UTun controller 620 sends the data packet over the primary socket to link manager 625. UTun controller 620 can provide the destination address of the second device, since the first layer of header information identifies a virtual address. In one embodiment, UTun controller 620 can remove data (e.g., the virtual address and replace with an actual address) or compress data, which is described in more detail below. UTun controller 620 can also establish an encryption protocol to use with the second device for all data sent over the primary socket.

In step 657, link manager 625 selects the link to send the data packet via the primary socket. The selection can be based on various criteria mentioned herein. Different data packets for the same primary socket (i.e., to the same device) can be sent over different links. Examples of links are combined link 640, BTLE link 635, and Wi-Fi/UDP link 630. Each of the links can use an additional transport protocol on top of the transport protocol used by kernel 610.

In step 658, the selected link 630 add any header information to the data packet, e.g., a UDP header. The second layer of header information can make sure the data packet is sent to the correct device. The receiving link can strip out the second layer of header information, and send the rest of the data packet to a corresponding link manager on the other side. The other link manager can know the first device ID by which link received the data packet (e.g., as a link can be assigned to a particular device), and the first ID can be used to map the data packet to a particular client connection (e.g., a TCP socket on the other end).

C. Outgoing Messages

Figure 7:
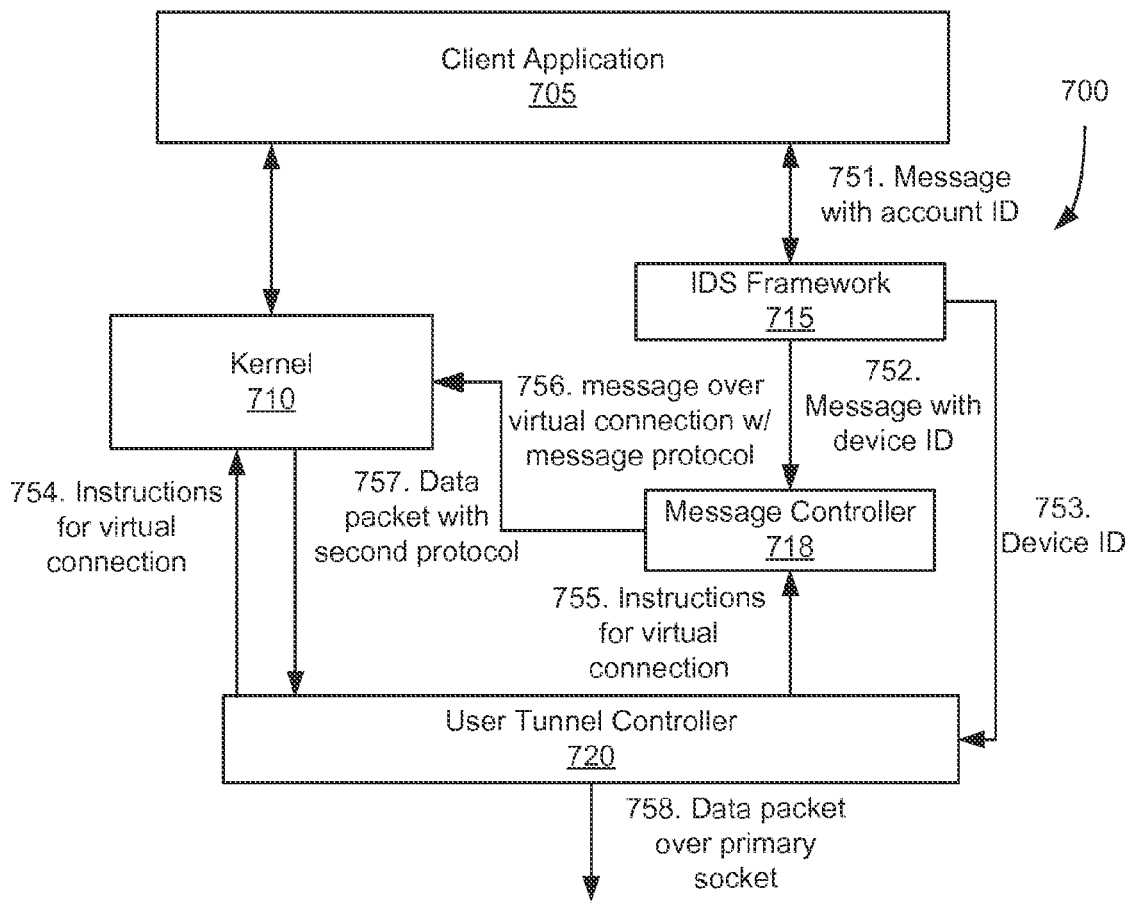
FIG. 7 shows an example process flow for an outgoing message for a protocol stack 700 according to embodiments of the present invention.

FIG. 7 shows an example process flow for an outgoing message for a protocol stack 700 according to embodiments of the present invention. One client application 605 is executing on a first device, but other applications can be running and communicating with a second device.

In step 751, client application 705 can send a message to IDS framework 715, with an identification of an account. A device ID could be sent if it is known. IDS framework can determine a device ID.

In step 752, IDS framework 715 can send the message with a device ID to a message controller 718. Message controller 718 can add a first layer of header information (message protocol) to the message. For example, the header information can include the second device ID, the requesting application (i.e., 705), a destination application, account information of a user of either device, options, size of the payload, and any other suitable header information.

In step 753, IDS framework 715 can send the device ID to UTun controller 720, which can create a primary socket and map a device ID and a virtual connection to the primary socket. In another example, the device ID can be sent by message controller 718 in a request to open a connection. The virtual connection is between kernel 710 and message controller 718, which may associate the virtual connection to a virtual address (kernel 710) or to a device ID (message controller 718). Multiple virtual connections can be created between kernel 710 and message controller 718, and can differ by a different destination device and/or priority. For example, two virtual connections can exist for a same destination device, with one having a high priority and the other virtual connection a low priority. Messages from multiple client application can be sent using a same virtual connection.

In steps 754 and 755, UTun controller 720 sends instructions to message controller 718 and to kernel 710. The instructions can provide a socket number for creating a virtual connection between message controller 718 and kernel 710. In one implementation, the instructions to message controller 718 associate the virtual connection with the device ID (via socket number), which is known to message controller 718. And, the instructions to kernel 710 associate the virtual connection with a virtual address (via socket number), which is then stored at kernel 710 for later use. Thus, the socket number is used by message controller 718 and kernel 710 to coordinate the communication of messages via a mutually known socket.

In step 756, message controller 718 sends the message over the virtual connection to kernel 710. Kernel 710 can then create data packets according to a second protocol (e.g., TCP) and add a second layer of header information according to the second protocol.

In step 757, kernel 710 can send data packets to UTun controller with a second layer of header information of the second protocol, i.e., the second layer added to message header). Thus, a data packet can include header information from any module upstream. Accordingly, once there is the virtual connection, whenever a client application sends a message to the second device, the data in the message can come back to the UTun controller through the kernel, e.g., a TCP/IP stack.

In step 758, UTun controller 720 send the data packet over the primary socket to the second device. The primary socket can be identified via a virtual address in the second layer of header information of the data packet. In a messaging example, ports and other data can be stripped out of the second header layer (e.g., stripping out information that is redundant with the message protocol header). The remaining parts of the process can proceed as in FIG. 6 and other sections described herein.

In other embodiments, UTun controller 720 can provide a transport layer protocol (e.g., TCP). In such an example, kernel 710 would not be needed, and a virtual connection can be established between UTun controller 720 and message controller 718. And, if the device ID was in an IP format, a mapping may not be needed. A table can still exist with active primary sockets. Or, the transport layer protocol added by UTun controller 720 can used a device ID.

D. Incoming Data

Figure 8:
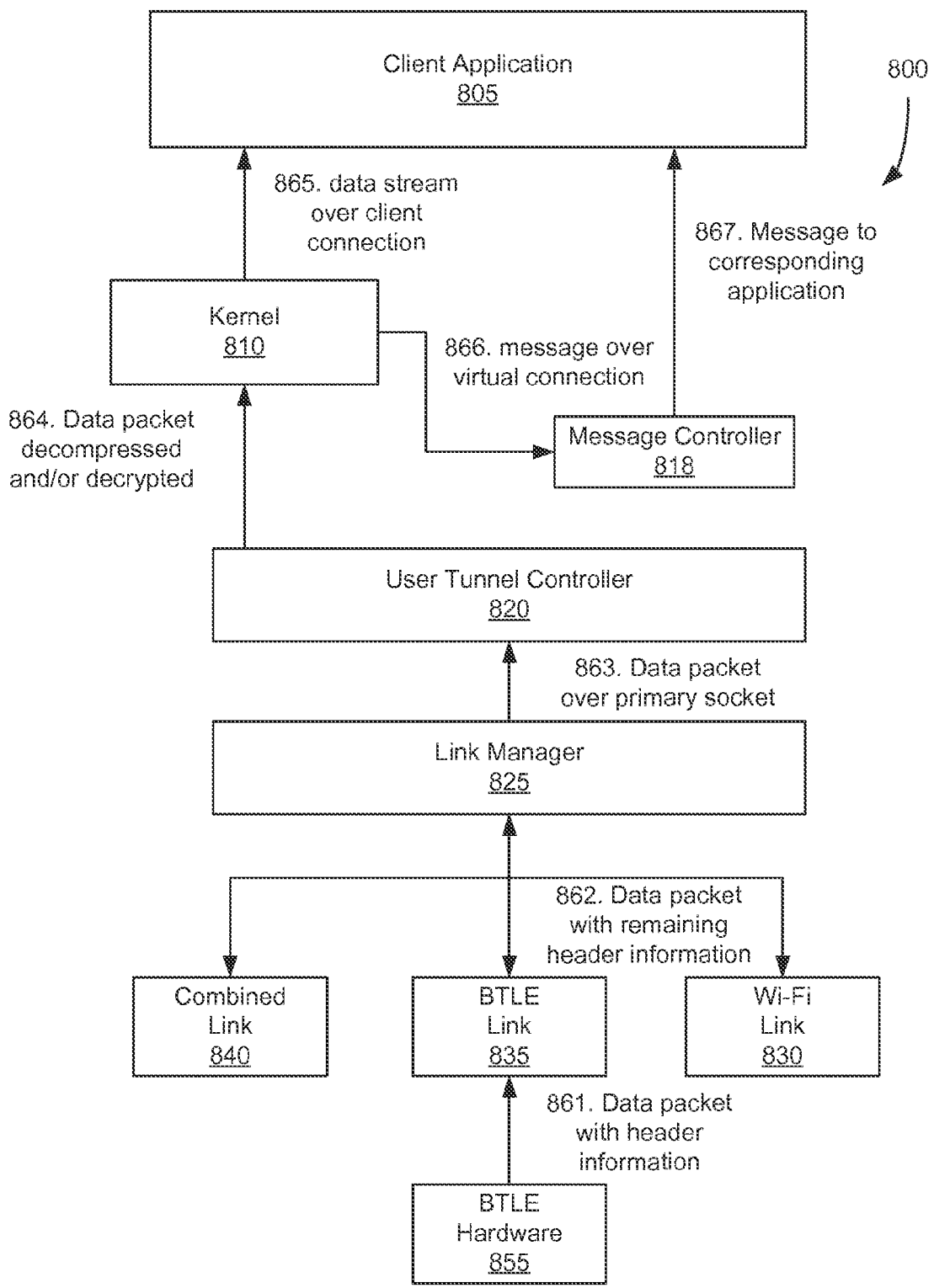
FIG. 8 shows an example process flow for incoming data for a protocol stack according to embodiments of the present invention.

FIG. 8 shows an example process flow for incoming data for a protocol stack 800 according to embodiments of the present invention. One client application 805 is executing on a first device, but other applications can be running and communicating with a second device.

In step 861, BTLE hardware 855 sends a data packet to BTLE link 835. BTLE hardware 855 can receive the packet from a second device. BTLE hardware 855 can include software functionality for determining which BTLE link corresponds to the second device. For example, a first layer of header information can be used to determine a source of the data packet, and a table can be used to determine which link should receive the data packet.

In step 862, BTLE link can strip out any header information used and send the data packet to link manager 825. If a different transport layer protocol is used (e.g., UDP over Wi-Fi), a UDP header can be stripped out. Link manger 825 can identify which link sends a data packet, and thus it can know what the second device is. Later modules can also remove header information, e.g., UTun controller can strip out any header information used for the primary socket connection to the second device.

In step 863, link manager 825 can send the data packet to a UTun controller 820. Link manager 825 can send a device ID to UTun controller, where the device ID corresponds to the second device and can be known based on BTLE link 835 being used, as BTLE link 835 is associated with the second device. UTun controller 820 can decompress or decrypt any remaining header information. UTun controller can also specify a connection (e.g., a TCP socket) for the data packet, so that kernel 810 can identify where to send the data packet.

In step 864, kernel 810 can receive a data packet having header information being implemented by kernel 810. For example, kernel 810 can employ a TCP library and analyze a TCP header in the data packet. Kernel 810 can identify the connection associated with the data packet. For example, a destination client application can be specified, e.g., as a port. The header information can also specify whether the data packet is part of a message or a stream. For example, a virtual address in the header can be associated with client connection for communicating a data stream.

In steps 865 or 866, a data packet is sent over the corresponding client/virtual connection. The client connection is directly with client application 805, and a virtual connection is with message controller 818. The connection selected depends on which connection is specified by the header information, e.g., which TCP socket is specified. A client connection can be a virtual connection when the destination is a virtual address. A virtual connection can be a client connection when the connection is between the client application and another module.

In step 867, message controller 818 sends a message to the client application that is identified in the header information for the message protocol. Message controller 818 can send the message directly to client application 805.

E. Priority

As mentioned above, different virtual connections can have different priority levels. Thus, multiple virtual connections can exist between a message controller and a kernel for a same second device. Each virtual connection in this group would correspond to a different priority. The priority of a virtual connection can be specified by the client application that is requesting communication with the other device. For example, in step 753 of FIG. 7, the priority can be included in the request to UTun controller 720, so that a virtual connection of the desired priority is created between kernel 710 and message controller 718. If a virtual connection with the specified priority does not exist, then one can be created.

When the UTun controller gets data packets from the kernel, the UTun controller can identify the virtual connection and identify the priority. The UTun controller can then determine which data packets get sent out at which time. Packets with higher priority can be sent before packets with lower priority. Time stamps can be used to identify low priority packets that have been waiting a long time, and send them ahead of recent high priority packets. Any suitable form of scheduling logic can be used. If there is available bandwidth, both low and high priority data packets can be sent at the same time.

IV. Link Manager

In some embodiments, a link manager can be used to select a particular link (e.g., hardware interface and transport protocol) to send a data packet or set of data packets. The link manager can make this decision for each data packet or multiple data packets, e.g., once for every 50 data packets or a group that comprises a message. The link manager does not need to know where a packet is from (e.g., which client application sent the data, its priority, and whether it is part of a stream or a message). The link manager can receive the data packet from the UTun controller (which can specify the second device), and then the link manager can send the data packet over the selected link. Thus, the UTun controller can reference the remote device in a single way (e.g., just tell link manager which device to send to).

Depending on the selected link, the data packet can be sent in various ways, e.g., using different hardware interfaces. Additional header information can be added. For example, when combined link 340, 640, 840 is used, a checksum can be added for error detection.

The link manager can keeps statistics about all the links, and use the statistics to determine which link to use. For example, bandwidth availability and usage for each link can be monitored and used as factors in the selection decision. Heuristics can analyze the link statistics to determine which link to use. In one implementation, the heuristics can seek to optimize energy efficiently while maintaining a minimum data rate, and thus choose the link that can satisfy both criteria. Each statistic (e.g., data rate) for a link can be a parameter, or multiple statistics can be combined into a single parameter.

For example, if the link manager is seeing less than a threshold amount of data, then a BTLE link can be chosen as it uses low power. But, if the link manager starts to see more data, then a switch can be made to send the data over Classic Bluetooth. If a buffer for the Classic Bluetooth link builds up, then a Wi-Fi link can be selected for sending the data packets. Link manager can also identify whether a particular link is available, e.g., the first or second device is not connected via Wi-Fi. Thus, a best option for power and throughput can be chosen based on current statistics of the available links.

In one embodiment, a parameter for a link can be determined from at least one of: a signal strength, a data rate, and an energy usage associated with the link. Respective parameters can be determined for each of the plurality of links. The parameters can be compared to each other or thresholds to determine which link to select. For example, the link with a lowest energy usage while keeping a data rate above a threshold can be selected.

In some embodiments, a combined link (e.g., 340) is selected first. If the connection using combined link 340 is successful, e.g., certain connection properties meet expectations. If combined link 340 does not meet specific expectations, another link can be tried. For example, combined link 340 might suffer problems due to range, a weak signal, or some other errors.

Connection information for other links can be sent over combined link 340 when it is operational. A link manager (e.g., 325) can use the connection information in creating a connection using another link. For example, connection information for an infra Wi-Fi link (infrastructure mode) can be obtained via combined link 340, and if the connection using combined link 340 is substandard, then the connection information for the infra Wi-Fi link can be used. In another implementation, an ad hoc Wi-Fi connection can be used. Further, a connection to the other device through a server can also be tried. This may be advantageous when the two devices are not close enough to communicate peer-peer and when the two devices are not connected to a same access point.

In other embodiments, another link is selected first. For example, an infra Wi-Fi link can be selected when a large file (e.g., MB of data) is to be sent. This may be done when as infra Wi-Fi has larger throughput than combined link 340, which may have a rate of about 1.6 Mbps. The connection information for infra Wi-Fi can still be initially obtained for combined link 340. The throughput of the infra Wi-Fi link can be monitored, and if the throughput is below expectation and/or below an expected throughput of combined link 340, then the connection can be switched to using combined link 340. The amount of data queued can be used as a criteria for selecting a link.

V. Retransmission

Certain transport protocols (e.g., TCP) implement retransmissions of a data packet when an acknowledgement is not received by a certain amount of time from the other device. Such decisions can be a first rule for determining whether to send a retransmission. If the first rule indicates a retransmission should be sent, then another rule can be used to determine whether the retransmission should actually be sent. For example, the type of link and a reliability level of the link can be used to determine whether the retransmission is to be sent. In one implementation, retransmissions are not sent for certain links.

As described above, the kernel can implement TCP, and send the TCP packets to the UTun controller. In one embodiment, the UTun controller can receive the retransmission and determine whether to send to the other device. For example, the UTun controller can know which link the data packet was sent; and if the link is deemed reliable, the retransmitted packet can be discarded by the UTun controller and not sent.

Accordingly, in one embodiment, the TCP implementation may make no assumption about the link used, and retransmit packets based on a standard heuristic. For example, the kernel can retransmit packets when it receives information that leads it to conclude that some packets have been lost or no acknowledgement is received with time limit. But, depending on the link, the roundtrip time might not be consistent, which can generate excessive retransmissions. If the link is deemed reliable, e.g., based on other statistics, known behavior, or settings, then a retransmission can be discarded to save bandwidth. The UTun controller can be in contact with the link manager to determine whether a retransmission should be discarded.

VI. Encryption

In some embodiments, the data sent over the primary socket connection can be encrypted. The UTun controller or other sub-module (e.g., as part of a mux module) can negotiate an encryption context to use for the primary socket connection. For example, the UTun controller of the first device can establish a primary socket with the UTun controller of the second device. The two UTun controllers can negotiate an encryption technique and exchange any encryption keys needed for the session. In one implementation, public key infrastructure (PKI) is used for messages and streams, and any control packets.

When one UTun controller sends a data packet, it can encrypt the data packet before sending to the link manager. And, the other UTun controller can decrypt the data packet before sending to the corresponding kernel. A new encryption context can be created at any time. In some implementations, multiple primary socket connections can exist between the same two devices, and each one can have a different encryption context. In various embodiments, an encryption context can specify a particular key and a particular encryption algorithm to use.

VII. Header Compression

In some embodiments, header information in the data packets can be compressed. The header compression can be performed by the UTun controller. For example, the UTun controller of a first device can send a compress context to the UTun controller of the other device. The compression context can relate a number to a set of information, e.g., the source port and the destination port. Thus, each TCP socket managed by the kernel can correspond to a different number. A mapping between numbers and port information (and any other compressed data) can be used for compression and decompression. The compression context can be negotiated via a control channel, which does not use compression and is set up separate from the primary socket connection used for data. The same control channel can be used to negotiate the compression context for any number of virtual connections.

Header information for a messaging protocol (or any transport protocol before the UTun controller) can be compressed. In some implementations, compression can always be done for any header information, or only when certain criteria is met (e.g., bandwidth) or trigger occurs (e.g., when traffic exceeds a specific amount or virtual connection is for a data stream). Generally, the header compression does not use significant overhead and thus can always be used. In addition to compression, certain parts of a header can be excluded (e.g., a checksum or requirement of a delivery receipt) so as to reduce header size.

Figure 9A:
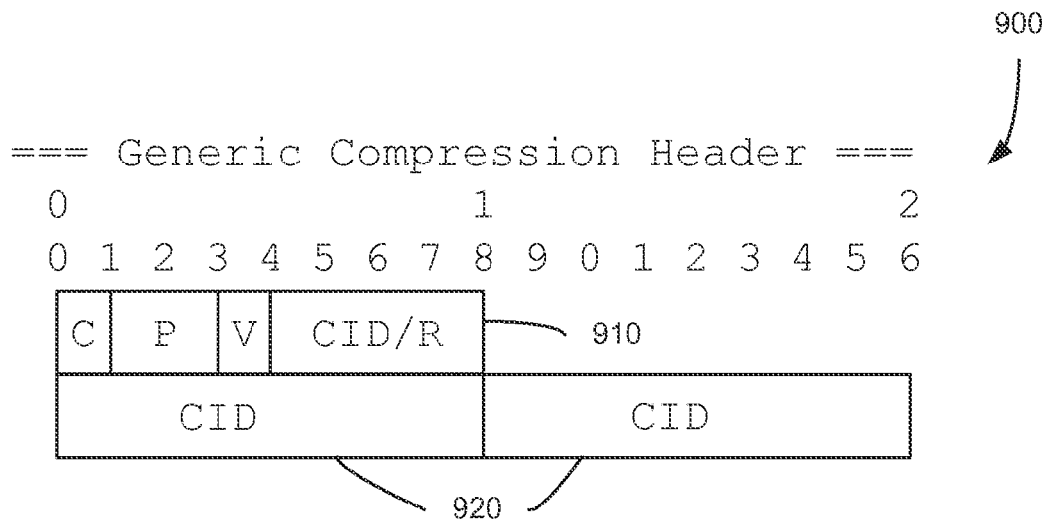
FIG. 9A shows a generic compression header according to embodiments of the present invention.

FIG. 9A shows a generic compression header 900 according to embodiments of the present invention. The first two rows of numbers simply show data size, i.e., two bytes in this example. The first data bit is the compression bit C (1 bit), which corresponds 0 for no compression and 1 when compression is used). The variable P (2 bits) specifies a transport protocol (e.g., 00—UDP, 01—TCP). When 2 bits are used, two other transport protocols can be supported.

The variable V (1 bit) specifies whether a short version or a long version is used (e.g., 0—Small; 1—Large). The small version supports fewer connections for compression, and the large version supports more connections for compression. In this example, the short version uses a context ID (CID) shown as CID 910. This small CID is 4 bits, and can support 16 virtual connection (0-15). For example, when a header has CID 910 as 8, the other device knows the corresponding port information based on the compression context (e.g., by the UTun controller specifying that 8 corresponds to particular port information via a control channel). The large CID is 16 bits (0-65535). The small CID can be reserved (labeled R) and set to 0 when the large CID is used. The 2 bytes for the large CID can be present only when V=1. A CID is an example of a compression number.

In one embodiment, usage statistics can be tracked for the different virtual connections (e.g., a TCP socket of the kernel). If a virtual connection is busy, it can be assigned a number between 0-15 for the small CID. Thus, when data is sent for this busy virtual connection, the small CID can be used, thereby saving 2 bytes. Virtual connections that are showing less usage can be assigned to a large CID. If fewer than 16 virtual connections exist for the second device, then only the small CID is needed. Further, if a particular virtual connection is not being used much, the sequence number and acknowledgement number can be reduce, e.g., from 4 bytes to 2 bytes.

Virtual connections can have CID numbers swapped such that a busy connection (with a first large number) gets a small number and a less busy connection gets the first large number. For example, a first connection that has a large number can be moved to a small number when the first connection is busy. A second connection that is assigned to a small number can then be changed to have a large number as the second connection is used less frequently.

Figure 9B:
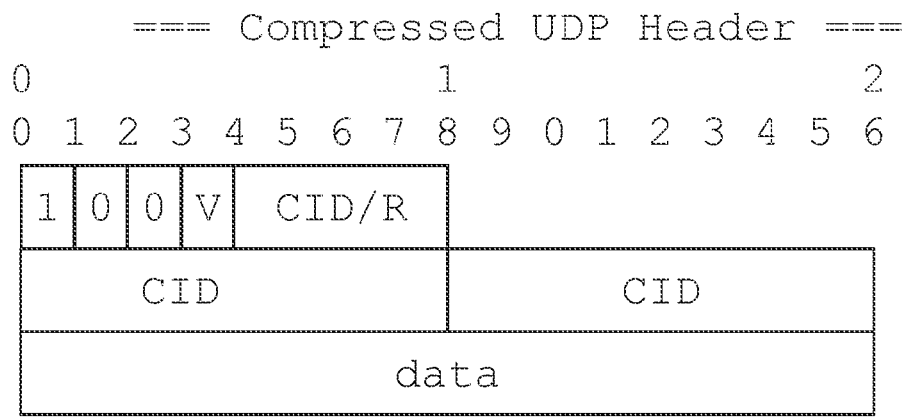
FIG. 9B shows a compressed UDP header according to embodiments of the present invention.

FIG. 9B shows a compressed UDP header 950 according to embodiments of the present invention. The compressed UDP header substitutes the 4 bytes of port information (e.g., when each port is specified by 2 bytes) with either 1 byte or 3 bytes, depending on whether the small version or large version. The data is shown after the header information. In this example, C is 1 to indicate compression, and P is 00 to specify UDP. As stated above, V can be used to specify whether 4 bits (small) of the first byte or two additional bytes (large) are needed.

Figure 10:
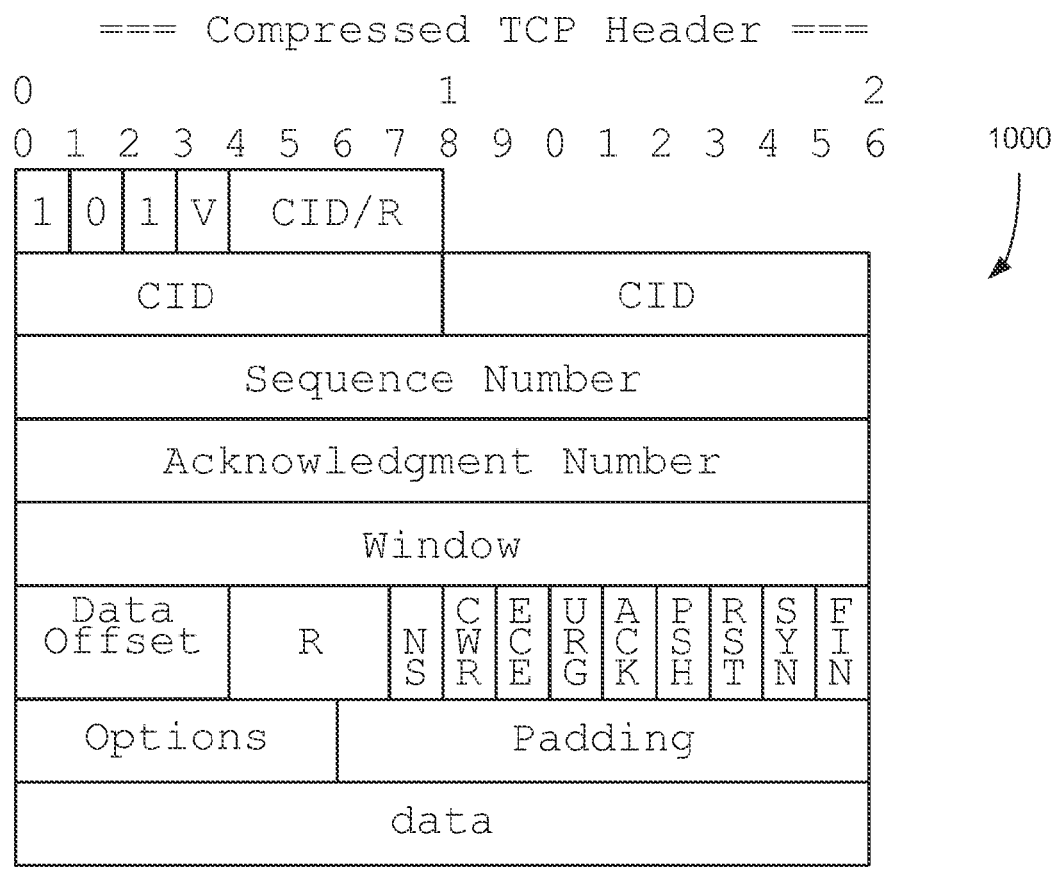
FIG. 10 shows a compressed TCP header according to embodiments of the present invention.

FIG. 10 shows a compressed TCP header 1000 according to embodiments of the present invention. In this example, C is 1 to indicate compression, and P is 01 to specify TCP. The TCP header also includes additional information, such as: sequence number, acknowledgement number, window, data offset, options, and padding. Other information can include a checksum and urgent pointer. Like for UDP, the compressed TCP header substitutes the 4 bytes of port information with either 1 byte or 3 bytes.

Once a compression context has been established, a first UTun controller can replace certain header information with a CID number via the scheme described above. Given the compression context has previously been communicated between the UTun controllers, the receiving UTun controller can interpret the compressed header, i.e., decompress the header.

VIII. Mobile Device

Figure 11:
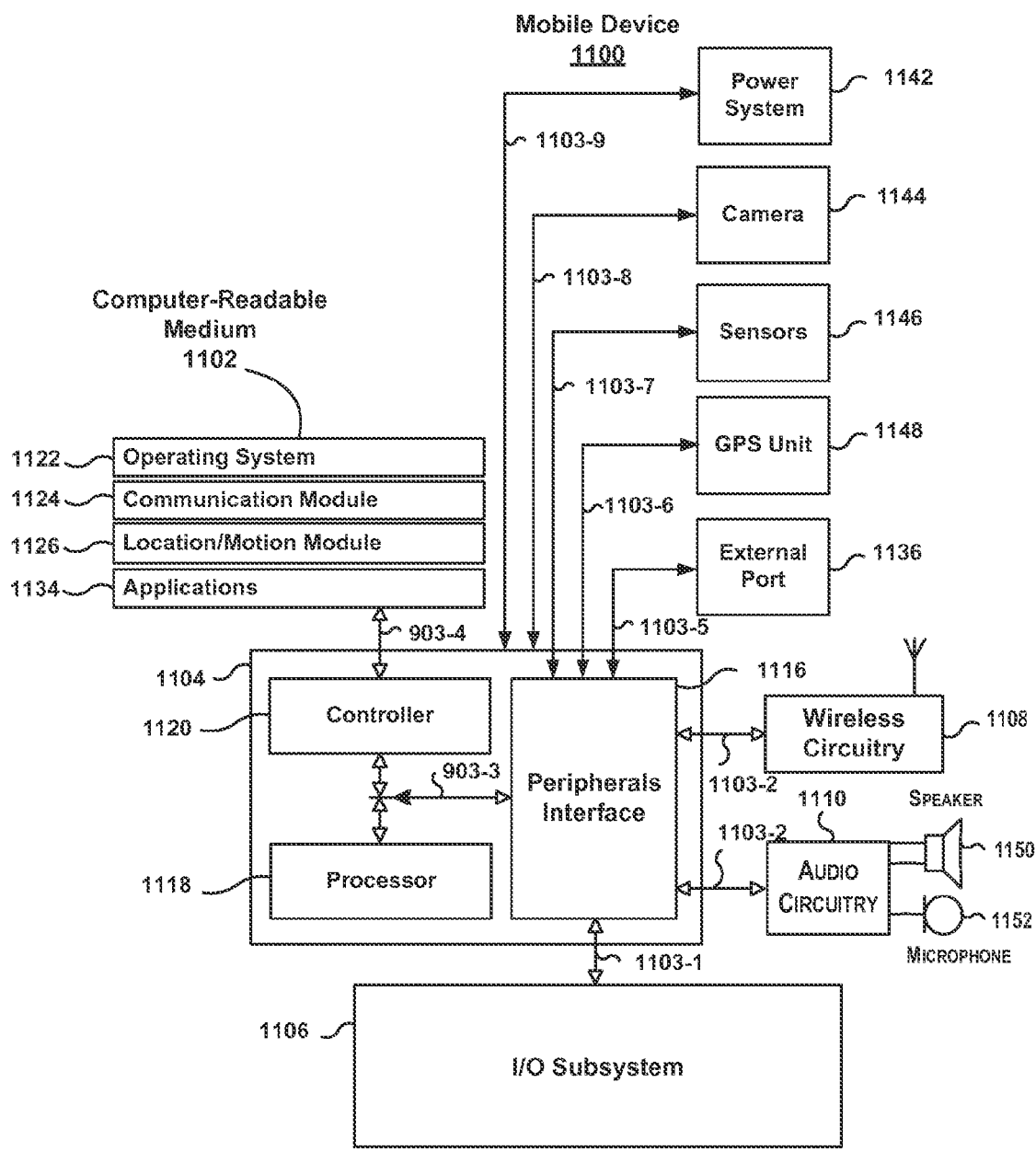
FIG. 11 is a block diagram of a portable electronic device or mobile device according to embodiments of the present invention.

FIG. 11 is a block diagram of a portable electronic device or mobile device 1100 according to an embodiment of the invention. Mobile device 1100 generally includes computer-readable medium 1102, a processing system 1104, an Input/Output (I/O) subsystem 1106, wireless circuitry 1108, and audio circuitry 1110 including speaker 1150 and microphone 1152. These components may be coupled by one or more communication buses or signal lines 1103. Device 1100 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 11 is only one example of an architecture for mobile device 1100, and that device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1108 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1108 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 1108 is coupled to processing system 1104 via peripherals interface 1116. Interface 1116 can include conventional components for establishing and maintaining communication between peripherals and processing system 1104. Voice and data information received by wireless circuitry 1108 (e.g., in speech recognition or voice command applications) is sent to one or more processors 1118 via peripherals interface 1116. One or more processors 1118 are configurable to process various data formats for one or more application programs 1134 stored on medium 1102.

Peripherals interface 1116 couple the input and output peripherals of the device to processor 1118 and computer-readable medium 1102. One or more processors 1118 communicate with computer-readable medium 1102 via a controller 1120. Computer-readable medium 1102 can be any device or medium that can store code and/or data for use by one or more processors 1118. Medium 1102 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1116, one or more processors 1118, and memory controller 1120 can be implemented on a single chip, such as processing system 1104. In some other embodiments, they can be implemented on separate chips.

Mobile device 1100 also includes a power system 1142 for powering the various hardware components. Power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1100 includes a camera 1144. In some embodiments, mobile device 1100 includes sensors 1146. Sensors can include accelerometers, compass, gyrometer, pressure sensors, audio sensors, light sensors, barometers, and the like. Sensors 1146 can be used to sense location aspects, such as auditory or light signatures of a location.

In some embodiments, mobile device 1100 can include a GPS receiver, sometimes referred to as a GPS unit 1148. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1118 run various software components stored in medium 1102 to perform various functions for device 1100. In some embodiments, the software components include an operating system 1122, a communication module (or set of instructions) 1124, a location module (or set of instructions) 1126, and other applications (or set of instructions) 1134. Communication module 1124 can includes modules described herein, such as a mux module, which may include a message controller, a UTun controller, and parts of a kernel.

Operating system 1122 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1124 facilitates communication with other devices over one or more external ports 1136 or via wireless circuitry 1108 and includes various software components for handling data received from wireless circuitry 1108 and/or external port 1136. External port 1136 (e.g., USB, FireWire, Lightning connector, 30-pin connector, etc.) is adapted for coupling directly to other devices or indirectly over a network (e.g., the Internet, wireless LAN, etc.).

Location/motion module 1126 can assist in determining the current position (e.g., coordinates or other geographic location identifier) and motion of mobile device 1100. Modern positioning systems include satellite based positioning systems, such as Global Positioning System (GPS), cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location/motion module 1126 receives data from GPS unit 1148 and analyzes the signals to determine the current position of the mobile device. In some embodiments, location/motion module 1126 can determine a current location using WiFi or cellular location technology. For example, the location of the mobile device can be estimated using knowledge of nearby cell sites and/or WiFi access points with knowledge also of their locations. Information identifying the WiFi or cellular transmitter is received at wireless circuitry 1108 and is passed to location/motion module 1126. In some embodiments, the location module receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 1100 based at least in part on the position coordinates of the corresponding transmitters. Regardless of the specific location technology used, location/motion module 1126 receives information from which a location fix can be derived, interprets that information, and returns location information, such as geographic coordinates, latitude/longitude, or other location fix data.

The one or more applications 1134 on the mobile device can include any applications installed on the device 1100, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications 1134 can also include a specific app for finding a parked car, a maps application, or any other suitable application.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1106 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1100 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Advantages to certain embodiments of the invention include automatically marking a parking location when it is determined that a car is in a parked state. This can be done without prompting by the user and therefore the user does not have to remember to manually mark a parking location. This improves the user experience and is more convenient for the user.

Further advantages to certain embodiments of the invention include enabling parking location marking in weak location signal scenarios. Some embodiments of the invention permit marking a car's parking location without using transponders in parking areas (e.g., transponder near parking spots) to transmit a unique identifier which can be used to locate a parking spot.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. Any such computer readable medium may reside on or within a single computer product (e.g. a hard drive, a CD, or an entire computer system), and may be present on or within different computer products within a system or network. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method comprising:
   at a first mobile device having one or more processors:
      receiving, at a mux module over a first connection, first data having a payload sent from a first client application executing on the one or more processors, the mux module executing on the one or more processors of the first mobile device, and the first data including first header information identifying a second device as a destination for the first data, wherein a virtual address is assigned to the first connection;

identifying, by the mux module, a primary socket connection between the first mobile device and the second device, wherein the mux module includes a tunnel controller, and wherein identifying the primary socket connection for the first data includes:

creating, at the tunnel controller, a mapping between a device identifier of the second device and the virtual address;

transmitting the first data to the second device using the primary socket connection;

receiving, at the mux module over a second connection, second data having a payload sent from a second client application executing on the one or more processors, the second data including second header information identifying the second device as the destination for the second data;

identifying, by the mux module, that the primary socket connection exists between the first mobile device and the second device; and transmitting the second data to the second device using the primary socket connection.

2. The method of claim 1, wherein the mux module further includes a kernel and a message controller, wherein the first data is sent as part of a message, the method further comprising:

at the first mobile device:

receiving, at the message controller, the device identifier of the second device from the first client application; and creating a first socket connection between the message controller and the kernel, the message controller assigning the first socket connection to the device identifier, the kernel assigning the first socket connection to the virtual address.

3. The method of claim 2, further comprising:

at the first mobile device:

receiving the message at the message controller;

sending the first data to the kernel;

creating data packets from the first data;

sending the data packets to the tunnel controller, the data packets identifying the virtual address;

identifying the device identifier using the mapping of the virtual address to the device identifier; and using the device identifier to identify the primary socket connection.

4. The method of claim 1, wherein the mux module further includes a kernel, wherein the first data is sent as part of a stream, the method further comprising:

at the first mobile device:

creating the first connection between the kernel and the first client application.

5. The method of claim 4, further comprising:

at the first mobile device:

receiving the first data at the kernel and creating data packets from the first data;

receiving the data packets at the tunnel controller, the data packets identifying the virtual address;

identifying the device identifier using the mapping of the virtual address to the device identifier; and using the device identifier to identify the primary socket connection.

6. The method of claim 1, further comprising:

at the first mobile device:

identifying a link used to transmit the first data;

determining that a retransmission of one or more data packets of the first data should be performed based on a first rule; and using a second rule to determine whether the retransmission is to be sent, wherein the second rule is dependent on the identified link used to transmit the first data.

7. The method of claim 6, wherein the first connection is a TCP socket, wherein the first rule is a TCP rule, and wherein the retransmission is not sent when the identified link is designated for not sending retransmissions.

8. The method of claim 1, further comprising:

at the first mobile device:

identifying a first transport header in the first header information;

determining that at least a portion of the first transport header is to be compressed;

assigning a compression number to the at least a portion of the first transport header;

sending the compression number and the least a portion of the first transport header as part of negotiating a compression context; and sending the first data using the compression number.

9. The method of claim 8, further comprising:

at the first mobile device:

adding compression bits to the first header information, the compression bits identifying whether compression is used and a transport protocol corresponding to the first transport header.

10. The method of claim 8, further comprising:

at the first mobile device:

adding one or more version bits to the first header information, the one or more version bits specifying a size of the compression number, wherein at least two different sizes are specified by the one or more version bits.

11. The method of claim 10, further comprising:

at the first mobile device:

identifying that the first connection has a higher usage than the second connection, wherein the first connection is associated with a small version size and the second connection is associated with a large version size, the large version size being larger than the small version size;

swapping values of the one or more version bits of the first and second connections; and swapping compression numbers for the first and second connections.

12. The method of claim 1, further comprising:

at the first mobile device:

selecting a first link from among a plurality of links for sending the first data to the second device, wherein the first data is transmitted using the first link.

13. The method of claim 12, wherein the first link corresponds to a particular wireless interface and a particular transport layer protocol.

14. The method of claim 12, further comprising:

at the first mobile device:

selecting a second link from among the plurality of links for sending the second data to the second device, wherein the second data is transmitted using the second link, the second link being different than the first link.

15. A mobile device comprising:
a user interface;
one or more wireless interfaces; and
one or more processors coupled to the one or more wireless interfaces and the user interface, the one or more processors configured to:
  receive, at a mux module over a first connection, first data having a payload sent from a first client application executing on the one or more processors, the first data to be sent to a second device, and the mux module executing on the one or more processors of the first mobile device, wherein a virtual address is assigned to the first connection;
  identify, by the mux module, a primary socket connection between the mobile device and the second device, wherein the mux module includes a tunnel controller, and wherein identifying the primary socket connection for the first data includes:
    creating, at the tunnel controller, a mapping between a device identifier of the second device and the virtual address;
  transmit the first data to the second device using the primary socket connection;
  receive, at the mux module over a second connection, second data having a payload sent from a second client application executing on the one or more processors, the second data to be sent to the second device;
  identify, by the mux module, that the primary socket connection exists between the first mobile device and the second device; and
  transmit the second data to the second device using the primary socket connection.

16. The mobile device of claim 15, wherein the mux module further includes a kernel and a message controller, wherein the first data is sent as part of a message, wherein the one or more processors are further configured to:
  receive, at the message controller, the device identifier of the second device from the first client application; and
  create a first socket connection between the message controller and the kernel, the message controller assigning the first socket connection to the device identifier, the kernel assigning the first socket connection to the virtual address.

17. The mobile device of claim 16, wherein the one or more processors are further configured to:
  receive the message at the message controller;
  send the first data to the kernel;
  create data packets from the first data;
  send the data packets to the tunnel controller, the data packets identifying the virtual address;
  identify the device identifier using the mapping of the virtual address to the device identifier; and
  use the device identifier to identify the primary socket connection.

18. The mobile device of claim 15, wherein the mux module further includes a kernel, wherein the first data is sent as part of a stream, wherein the one or more processors are further configured to:
  create the first connection between the kernel and the first client application.

19. The mobile device of claim 18, wherein the one or more processors are further configured to:
  receive the first data at the kernel and creating data packets from the first data;
  receive the data packets at the tunnel controller, the data packets identifying the virtual address;
  identify the device identifier using the mapping of the virtual address to the device identifier; and
  use the device identifier to identify the primary socket connection.

20. The mobile device of claim 15, wherein the one or more processors are further configured to:
  identify a link used to transmit the first data;
  determine that a retransmission of one or more data packets of the first data should be performed based on a first rule; and
  use a second rule to determine whether the retransmission is to be sent, wherein the second rule is dependent on the identified link used to transmit the first data, wherein the first connection is a TCP socket, wherein the first rule is a TCP rule, and wherein the retransmission is not sent when the identified link is designated for not sending retransmissions.

21. The mobile device of claim 15, wherein the one or more processors are further configured to identify a first transport header in the first header information;
  determine that at least a portion of the first transport header is to be compressed;
  assign a compression number to the at least a portion of the first transport header;
  send the compression number and the least a portion of the first transport header as part of negotiating a compression context; and
  send the first data using the compression number.

22. The mobile device of claim 21, wherein the one or more processors are further configured to:
  add one or more version bits to the first header information, the one or more version bits specifying a size of the compression number, wherein at least two different sizes are specified by the one or more version bits;
  identify that the first connection has a higher usage than the second connection, wherein the first connection is associated with a small version size and the second connection is associated with a large version size, the large version size being larger than the small version size;
  swap values of the one or more version bits of the first and second connections; and
  swap compression numbers for the first and second connections.

23. A computer product comprising a non-transitory computer readable medium storing a plurality of instructions that when executed control a first mobile device having one or more processors to perform operations comprising:
  receiving, at a mux module over a first connection, first data sent from a first client application executing on the one or more processors, the mux module executing on the one or more processors of the first mobile device, and the first data to be sent to a second device, wherein a virtual address is assigned to the first connection;
  identifying, by the mux module, a primary socket connection between the first mobile device and the second device, wherein identifying the primary socket connection for the first data includes:
    creating a mapping between a device identifier of the second device and the virtual address;
  transmitting the first data to the second device using the primary socket connection;
  receiving, at the mux module over a second connection, second data sent from a second client application executing on the one or more processors, the second data to be sent to the second device;

identifying, by the mux module, that the primary socket connection exists between the first mobile device and the second device; and transmitting the second data to the second device using the primary socket connection.

24. The computer product of claim 23, wherein the mux module includes a kernel, a tunnel controller, and a message controller, wherein the first data is sent as part of a message, wherein the tunnel controller creates the mapping between the device identifier and the virtual address, and wherein the operations further comprise:

receiving, at the message controller, the device identifier of the second device from the first client application; and creating a first socket connection between the message controller and the kernel, the message controller assigning the first socket connection to the device identifier, the kernel assigning the first socket connection to the virtual address.

25. The computer product of claim 24, wherein the operations further comprise:

receiving the message at the message controller;

sending the first data to the kernel;

creating data packets from the first data;

sending the data packets to the tunnel controller, the data packets identifying the virtual address;

identifying the device identifier using the mapping of the virtual address to the device identifier; and using the device identifier to identify the primary socket connection.

26. The computer product of claim 23, wherein the mux module further includes a kernel and a tunnel controller, wherein the first data is sent as part of a stream, wherein the tunnel controller creates the mapping between the device identifier and the virtual address, and wherein the operations further comprise:

creating the first connection between the kernel and the first client application.

27. The computer product of claim 26, wherein the operations further comprise:

receiving the first data at the kernel and creating data packets from the first data;

receiving the data packets at the tunnel controller, the data packets identifying the virtual address;

identifying the device identifier using the mapping of the virtual address to the device identifier; and using the device identifier to identify the primary socket connection.

28. The computer product of claim 23, wherein the operations further comprise:

identifying a link used to transmit the first data;

determining that a retransmission of one or more data packets of the first data should be performed based on a first rule; and using a second rule to determine whether the retransmission is to be sent, wherein the second rule is dependent on the identified link used to transmit the first data, wherein the first connection is a TCP socket, wherein the first rule is a TCP rule, and wherein the retransmission is not sent when the identified link is designated for not sending retransmissions.

29. The computer product of claim 23, wherein the operations further comprise:

identifying a first transport header in the first header information;

determining that at least a portion of the first transport header is to be compressed;

assigning a compression number to the at least a portion of the first transport header;

sending the compression number and the least a portion of the first transport header as part of negotiating a compression context; and sending the first data using the compression number.

30. The computer product of claim 29, wherein the operations further comprise:

adding one or more version bits to the first header information, the one or more version bits specifying a size of the compression number, wherein at least two different sizes are specified by the one or more version bits;

identifying that the first connection has a higher usage than the second connection, wherein the first connection is associated with a small version size and the second connection is associated with a large version size, the large version size being larger than the small version size;

swapping values of the one or more version bits of the first and second connections; and swapping compression numbers for the first and second connections.

* * * * *